US006260190B1

(12) United States Patent
Ju

(10) Patent No.: US 6,260,190 B1
(45) Date of Patent: Jul. 10, 2001

(54) UNIFIED COMPILER FRAMEWORK FOR CONTROL AND DATA SPECULATION WITH RECOVERY CODE

(75) Inventor: Dz-Ching Ju, Sunnyvale, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/132,558

(22) Filed: Aug. 11, 1998

(51) Int. Cl.[7] ........................................................ G06F 9/45
(52) U.S. Cl. ................................ 717/7; 717/4; 712/205
(58) Field of Search .................................. 395/704, 705, 395/707; 717/4, 7; 709/102, 103; 712/205, 206

(56) References Cited

U.S. PATENT DOCUMENTS

| | | | | |
|---|---|---|---|---|
| 5,611,063 | * | 3/1997 | Loper et al. | 712/205 |
| 5,634,023 | * | 5/1997 | Adler et al. | 712/224 |
| 5,692,169 | * | 11/1997 | Kathail et al. | 712/244 |
| 5,774,685 | * | 6/1998 | Dubey | 712/205 |
| 5,778,210 | * | 7/1998 | Henstron et al. | 712/218 |
| 5,799,179 | * | 8/1998 | Ebcioglu et al. | 712/234 |
| 5,812,811 | * | 9/1998 | Dubey et al. | 712/216 |
| 5,850,553 | * | 12/1998 | Schlansker et al. | 717/9 |
| 5,864,692 | * | 1/1999 | Faraboschi et al. | 712/216 |
| 5,881,280 | * | 3/1999 | Gupta et al. | 712/244 |
| 5,901,308 | * | 5/1999 | Cohn et al. | 712/244 |
| 5,915,117 | * | 6/1999 | Ross et al. | 710/262 |
| 5,946,487 | * | 9/1999 | Dangelo | 717/5 |
| 5,987,594 | * | 11/1999 | Panwar et al. | 712/216 |
| 5,991,869 | * | 11/1999 | Tran et al. | 712/204 |
| 5,996,060 | * | 11/1999 | Mendelson et al. | 712/205 |
| 5,999,738 | * | 12/1999 | Schlansker et al. | 717/9 |
| 6,032,244 | * | 2/2000 | Moudgill | 712/23 |

OTHER PUBLICATIONS

Rogers et al, "Software support for speculative loads", ACM ASPLOS, pp 38–30, Jun. 1992.*
Bernstein et al, "Code duplcation an assist for global instruction scheduling", ACM pp 103–113, 1991.*
Bernstein et al, "Global instruction scheduling for superscalar machines", ACM pp 241–255, Jun. 1992.*
Fu et al, "Value specualtion scheduling for high performance processors", ACM ASPLOS VIII, pp. 262–271, Oct. 1998.*
Bala et al, "Efficient instruction scheduling using finite state automata", IEEE, pp 46–56, 1995.*
Bringmann et al, "Speculative execution exception recovery using write back suppression", IEEE, pp 214–223, Oct. 1998.*

* cited by examiner

Primary Examiner—Mark R. Powell
Assistant Examiner—Anil Khatri

(57) ABSTRACT

A method and system for scheduling computer instructions for execution as part of a compilation process in which an original computer program that defines a set of operations is compiled to produce an executable program. The method may schedule instructions in a different execution order from the order defined by the original computer program. When certain instructions are scheduled to execute before other instructions which they followed in the original computer program, the executable program that results may produce a different operational behavior than the operational behavior defined by the original computer program. The method inserts additional instructions so that an executable program that includes instructions scheduled to execute before other instructions which they followed in the original computer program produces the same set of operations as defined by the original computer program.

27 Claims, 10 Drawing Sheets

FIG. 8

| | Left listing | | Right listing |
|---|---|---|---|

804↘ 1    sub  sp, sp, #12          1    sub  sp, sp, #12
             ↓1                               ↓1
806↘ 2    mov  0(sp), r0           2    mov  0(sp), r0/mov 4(sp), r2/mov 8(sp), r3
808↗         ↓1                               ↓1
     3    mov  4(sp), r2           3    cmp  r1, #0
             ↓1                               ↓1
     4    mov  8(sp), r3           4    beq  L3
             ↓1                               ↓1
     5    cmp  r1, #0              5    mov  r0, r1
             ↓1                               ↓1
     6    beq  L3                  6 L1: load r2, 0(r0)
             ↓1                               ↓3
     7    mov  r0, r1     818↘    7    cmp  r2, #0
812↘         ↓1                               ↓1
     8 L1: load r2, 0(r0)          8    beq  L2
             ↓3                               ↓1
     9    cmp  r2, #0  ↖810        9    mov  r0, r2/jmp L1
814↗         ↓1                               ↓1
     10   beq  L2                  10 L2: load r2, 4(r1)
             ↓1                               ↓3
     11   mov  r0, r2              11   add  r2, r2, #10
             ↓1                               ↓1
     12   jmp  L1                  12   store 4(r1), r2
             ↓1                               ↓1
     13 L2: load r2, 4(r1)         13   load r3, 4(r0)
             ↓3                               ↓3
     14   add  r2, r2, #10         14   add  r3, r2, r3
             ↓1                               ↓1
     15   store 4(r1), r2          15   store 4(r0), r3
             ↓1                               ↓1
     16   load r3, 4(r0)           16 L3: mov r0,0(sp)/mov r2, 4(sp)/mov r3, 8(sp)
             ↓3                               ↓1
     17   add  r3, r2, r3          17   add  sp, sp, #12/jmp r0
             ↓1
     18   store 4(r0), r3                818↗
             ↓1
     19 L3: mov r0, 0(sp)
             ↓1
     20   mov  r2, 4(sp)
             ↓1
     21   mov  r3, 8(sp)
             ↓1
     22   add  sp, sp, #12
             ↓1
     23   jmp  r0

```
1        sub  sp, sp, #12
              ↓1
2        mov  0(sp), r0/mov 4(sp), r2/mov 8(sp), r3
              ↓1
3        load r2, 0(r1)/mov r0, r1
              ↓3
4        cmp  r1, #0
              ↓1
5        beq  L3
              ↓1
6   L1:  cmp  r2, #0
              ↓1
7        beq  L2
              ↓1
8        mov  r0, r2/load r2, 0(r2)/jmp L1        ⟵ 902
              ↓3
9   L2:  load r2, 4(r1)/load r3, 4(r0)            ⟵ 904
              ↓3
10       add  r2, r2, #10
              ↓1
11       store 4(r1), r2
              ↓1
12       add  r3, r2, r3
              ↓1
13       store 4(r0), r3
              ↓1
14  L3:  mov  r0, 0(sp)/mov r2, 4(sp)/mov r3, 8(sp)
              ↓1
15       add  sp, sp, #12/jmp r0

17 + 5n
```

MEMORY CONFLICT TABLE

| REGISTER | MEMORY ADDRESS | VALID |
|---|---|---|
| r1 | 0x00A31234 | T |
| r10 | 0x013C0000 | F |
| r11 | 0x013C0024 | F |
| r13 | 0x00B002CC | T |
|  |  |  |
|  |  |  |
|  |  |  |
|  |  |  |
|  |  |  |
|  |  |  |

1102

1104  1106  1108

EXCEPTION LOG

| REGISTER | EXCEPTION | PC | OTHER STATUS |
|---|---|---|---|
| r2 | 0x0001 | 0x00A31310 |  |
| r3 | 0x0A02 | 0x00A3BC4 |  |
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |

1110

1112  1114  1116  1118

UNIFIED COMPILER FRAMEWORK FOR CONTROL AND DATA SPECULATION WITH RECOVERY CODE

TECHNICAL FIELD

The present invention relates to computer software compiler programs that translate source-language programs into equivalent compiled programs comprising assembly-language or machine instructions and, in particular, to a method and system for optimizing compiled programs by unsafely scheduling instructions for execution and by including additional instructions to correct errors that arise during execution of the unsafely scheduled instructions.

BACKGROUND OF THE INVENTION

Compilers are programs that translate computer programs written in source languages, such as FORTRAN, Pascal, C, and C++, into equivalent compiled programs consisting of assembly-language instructions or machine-code instructions. In order to be useful and commercially acceptable, a compiler needs to correctly translate source programs into compiled programs and needs to generate compact, space-efficient compiled programs that execute efficiently. A correct translation is a translation that produces a compiled program that is semantically equivalent to the source-language program from which the compiled program is translated. When a correctly compiled program is executed, the correctly compiled program operates exactly as defined by the source-language program for any possible input. There are a virtually limitless number of possible semantically correct translations for a given source-language program that range in size from some minimum number of assembly-language or machine-code instructions up to the largest number of assembly-language and machine-code instructions that can be practically stored within a computer system. It is desirable, for many reasons, for a compiler to select, from among the virtually limitless number of possible translations, a compiled program having a size, in instructions, reasonably close to the minimum possible size. When executed with some defined input, the execution times exhibited by the virtually limitless number of possible translations will range from some minimum execution time up to some theoretical execution time that may exceed the practical lifetime of a computer system. It is desirable for a compiler to select a translation that, over the range of inputs practically expected for the program, exhibits execution times reasonably close to the minimum possible execution time for the program.

The three above-described characteristics—correctness, space efficiency, and execution efficiency—are intimately related. It is often the case that a program that correctly executes for the majority of inputs, but that incorrectly executes on certain special, infrequently-expected inputs, may execute considerably faster, in general, than a completely correct program. By omitting the instructions and conditional branches required to detect and handle the infrequently expected inputs, it may be possible to produce an incorrect program that has fewer instructions along the critical control paths within the program. A larger, semantically correct program may execute faster than a smaller, semantically correct program. For example, space-efficient programs often contain loop structures in which a certain instruction or group of instructions is repeatedly executed while a loop control variable is incremented or decremented on each iteration. If, instead, the instruction or instructions within a loop are explicitly copied within the program, the incrementing and decrementing of the loop control variable may be avoided, thus decreasing the number of instructions executed and correspondingly decreasing the execution time for the larger program. However, larger, space-inefficient programs may incur considerable and often more than offsetting inefficiencies in storage and copying of instructions, within and between different internal components of the computer system, during execution.

In general, a compiler first correctly translates a source-language program into an intermediate program in a step called intermediate code generation. Then, a compiler invokes a wide array of different optimization techniques and strategies in order to produce a compiled program that retains the correctness of the intermediate code program, but that is both space-efficient and efficient in execution. Optimization techniques can detect and remove unnecessary instructions, can schedule groups of instructions for simultaneous execution on machines that support concurrent execution of more than one instruction, can transform less efficient algorithms to more efficient algorithms, and can rearrange the sequence of execution of instructions in order to minimize the overall execution time of the program. In some cases, rearranging the execution sequence may produce a program that is not semantically equivalent to the intermediate code program, but that is more efficient, in general, in execution. In such cases, additional instructions may be introduced in order to detect and correct the errors introduced by changing the sequence of instructions.

Two types of resequencing optimizations that may introduce run-time errors have attracted theoretical interest. The first type of resequencing optimzation is known as control speculation. Control speculation results from moving an instruction whose execution depends on a preceding conditional branch instruction to a position in the program preceding the conditional branch instruction. The relocated instruction may be executed in cases in which, had the relocated instruction not been moved, the instruction would not have been executed. Under certain conditions, to be discussed below, control speculation may result in run-time exceptions that do not occur during the execution of the non-optimized, semantically correct program.

The second type of instruction relocation is known as data speculation. Data speculation occurs when an instruction that loads a value into a register from memory and that occurs after an instruction that stores a value into memory is moved to a position in a program preceding the store instruction. When both the load and store instructions operate on the same memory location, the load instruction may load a different value in the optimized program than that loaded by the instruction in the non-optimized program as a result of executing prior to the store instruction.

A detailed discussion of the theory and implementation of compilers can be found in a number of textbooks, including *Compilers: Principals, Techniques, and Tools*, Aho, Sethi, and Ullman, Addison-Wesley Publishing Company, 1988 and *Advanced Compiler Design & Implementation*, Muchnick, Morgan Kaufmann Publishers, 1997. Various aspects of control and data speculation are described in the following references: (1) "Sentinel Scheduling with Recovery Blocks," D. I. August, B. L. Deitrich, and S. A. Mahlke, Tech Rep. CRHC-95-05, Center for Reliable and High-Performance Computing, University of Illinois, Urbana, Ill., February 1995; (2) "Speculative Execution Exception Recovery Using Write-Back Suppression," R. A. Bringmann, S. A. Mahlke, R. E. Hank, J. C. Gyllenhaal, and W. W. Hwu, *Proc. of the 26$^{th}$ Annual Int'l Symp. on Microarchitecture*, December 1993; (3) "Three Architectural Models for Compiler-controlled Speculative Execution," P. Chang, N. Waters, S. A. Mahlke, W. Y. Chen, and W. M. Hwu, *IEEE Trans. on Computers*, Vol. 44, No. 4, pp. 481–494, April 1995; (4) "Data Preload for Superscalar and VLIW Processors," W. Y. Chen, Ph.D. Thesis, University of Illinois, Urbana, Ill., 1993; (5) "HPL PlayDoh Architecture Specification: Version 1.0," V. Kathail, M. Schlansker, B. Rau, Hewlett-Packard Laboratories Technical Report, HPL-93-80, February 1994; (6) "Exploiting Instruction Level Parallelism in the Presence of Conditional Branches," S. A. Mahlke, Ph.D. Thesis, University of Illinois, Urbana, Ill., 1996; and (7) "Sentinel Scheduling for VLIW and Superscalar Processors," S. A. Mahlke, W. Y. Chen, W. W. Hwu, B. R. Rau, and M. S. Schlansker, *Proc. of the 5$^{th}$ Annual Int'l Conf. on Architectural Support for Programming Languages and Operating Systems*, pp. 238–247, 1992.

Although control and data speculation has been recognized as separate optimization techniques, a framework for incorporating both control and data speculation together in a single technique within a compiler has been lacking. Instead, control speculation has been treated separately from data speculation. This separate treatment results in separate optimization phases within the compiler, leading both to inefficiencies in compilation and to potentially incorrect execution of the optimized program is special cases where control and data speculation directly interfere with one another. Furthermore, although opportunities for control and data speculation are currently identifiable, a technique for handling potentially incorrect behavior of optimized programs that include control and data speculation have been unsatisfactory. For these reasons, a need has been recognized in the area of compiler optimization for a framework for incorporating control and data speculation together in a unified manner as an optimization strategy.

SUMMARY OF THE INVENTION

The present invention provides a uniform framework for incorporating control speculation and data speculation into the optimization strategies and techniques employed by a compiler to generate an optimized assembly-language or machine-code compiled program from a source-language program. One embodiment of the present invention first detects potentially speculated instructions and modifies the generation of dependence directed acyclic graphs ("DAGs") to incorporate control speculation edges and data speculation edges directed to the potentially speculated instructions. The embodiment of the present invention then modifies the list scheduling optimization phase, or an equivalent phase, to unsafely schedule potentially control speculated instructions and potentially data speculated instructions to produce speculated instructions, inserts special instructions into the compiled program code following scheduling of a speculated instruction, and makes appropriate modifications to the dependence DAGs to represent the inserted special instructions. Finally, the embodiment of the present invention provides a distinct new optimization phase, following the list scheduling phase, in order to generate code that corrects run-time errors that result from execution of the speculated instructions. The modifications and the insertion of instructions by the embodiment of the present invention address the different possible cascading effects that result from interdependencies between speculated instructions, as well as inter-dependencies between speculated instructions and instructions within the speculative chains associated with the speculated instructions. A speculative chain is one or more instructions that follow a speculated instruction, that depend on the speculated instruction, and that precede the inserted instruction that corresponds to the speculated instruction. The present invention thus produces semantically correct, optimized compiled programs that incorporate both control speculation and data speculation.

BRIEF DESCRIPTION OF THE DRAWINGS

FIG. 8 shows the assembly-language version of the routine "incEnds" as well as a moderately optimized version of the assembly-language version of the routine "incEnds."

FIG. 9 shows a further optimized version of the routine "incEnds" that includes both a control speculated "load" instruction and a data speculated "load" instruction arising from relocation of two different "load" instructions.

DETAILED DESCRIPTION OF THE INVENTION

The present invention will be described below following an introduction of control and data speculation through an illustrative example, additional background information related to compilation techniques, and a discussion of the architectural features of the computer system on which a preferred embodiment of the present invention is implemented. The present invention will then be described in overview, followed by a discussion of a series of implementation considerations related to control and data speculation. Finally, the implementation of a preferred embodiment of the present invention will be discussed, followed by discussion of certain advantages provided by the present invention and alternate embodiments of the present invention.

An Illustrative Example Program

Figure 1:
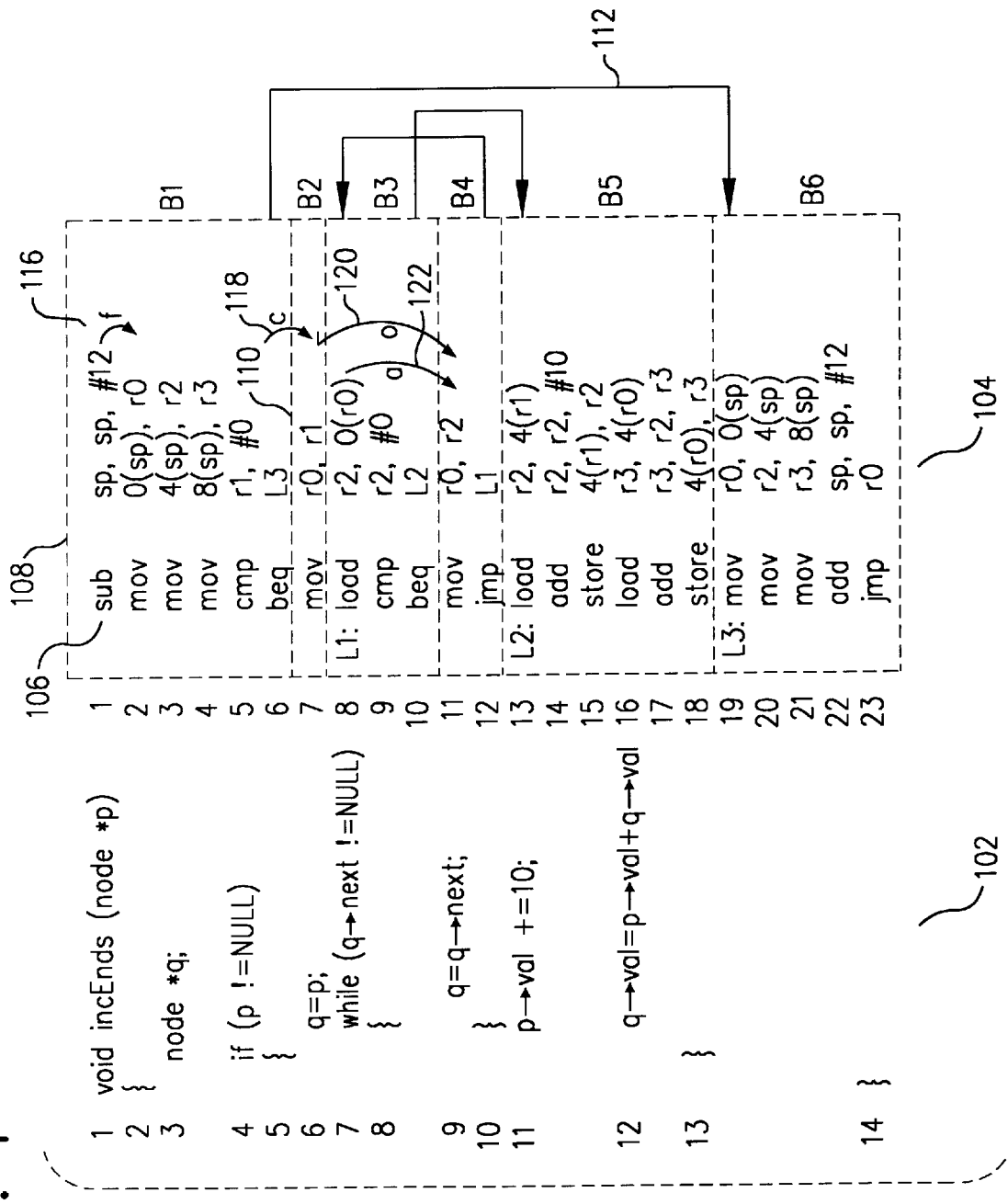
FIG. 1 shows a small source-language routine, along with an equivalent assembly-language routine.

FIG. 1 shows a small source-language routine "incEnds," written in the C programming language, along with an equivalent assembly-language version of the routine. The source-language version of incEnds is shown in column 102 of FIG. 1 and the equivalent assembly-language version of incEnds is shown in column 104. The FIGS. 2A–B, below, illustrate a linked list of nodes and the operations performed by incEnds on a linked list of nodes. The routine "incEnds" is designed to update several values in a linked list of nodes.

FIG. 2A illustrates a single node of a linked list on which "incEnds" is written to operate. A node 200 comprises a pointer field 202 called "next" and an integer field 204 called "val." A preceding node of a linked list is linked to a following node in the linked list through the pointer contained in the field "next" of the preceding node. The final node of a linked list contains a NULL pointer, indicating termination of the linked list.

FIG. 2B illustrates the operations performed by the routine "incEnds" on a linked list comprising three nodes. The six representations of the three-node linked list 206–211 show the results of various stages of execution of the routine "incEnds." The first linked list 206 in FIG. 2B represents the state of the three-node linked list at the beginning of execution of the routine "incEnds." The routine "incEnds" is passed a node pointer argument p 208, as shown on line 1 of the source-language version of the routine "incEnds" in column 102 of FIG. 1, that points to the initial node 210 of the link list. The routine "incEnds" uses a node pointer variable q, declared on line 3 of incEnds (column 102 of FIG. 1). On line 4 (column 102 of FIG. 1), incEnds compares the value of the node pointer argument p with the value NULL. If p is NULL, incEnds returns. Otherwise, on line 6, incEnds assigns the value of p to the variable q. That assignment is illustrated in FIG. 2B by the second linked list 207 in which p 212 and q 214 are illustrated pointing to the first node 216 of the link list 207. Lines 7–10 (column 102 of FIG. 1) of incEnds together compose a while loop in which the variable q is advanced node-by-node to the end of the linked list. In the first iteration of the loop, represented in linked list 208, q is advanced from the first node 216 of the linked list to the second node of the linked list 218 by assignment of the value of q 220 to the value contained in the field "next" 222 of the first node 216. In the second iteration of the loop, represented in linked list 209, q 224 is advanced to the final node 226 of the linked list 209. On line 11 (column 102 of FIG. 1), incEnds, as represented in linked list 210, adds 10 to the value contained in the field "val" 228 of the first node of the link list 230 that is still pointed to by the node pointer argument p 232. Note that the value contained in the field "val" 228, previously "5," 234, is changed by the assignment on line 11 to the value "15." Then, on line 12, incEnds adds the current value contained in the field "val" of the last node on the link list, "2" 236, to the value contained in the field "val" 228 of the first node of the link list, "15," and assigns the resulting value "17" to the field "val" 238 of the last node in the link list 240 pointed to by the node pointer variable q 242.

Figure 3:
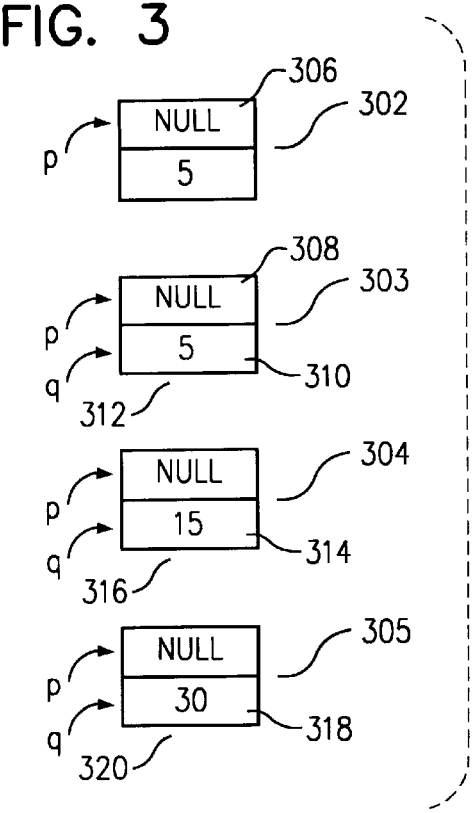
FIG. 3 illustrates execution of the routine "incEnds" on a linked list comprising one node.

FIG. 3 illustrates execution of the routine "incEnds" on a linked list having one node. The four representations of the single-node linked list, 302–305, show, the results of various stages of execution of the routine "incEnds." The first and only node 306 of the single-node linked list 302 contains the value "5" and is pointed to by the node pointer argument p. As before, following the test for a NULL node pointer argument on line 4 (FIG. 1), incEnds assigns the value of the node pointer p to the node pointer variable q, illustrated in FIG. 3 by the second single-node link list 303. Because the value of the field "next" 308 of the single node of the single-node link list is NULL 308, the test in the while loop on line 8 (FIG. 1) returns a FALSE value and incEnds then increments the value of the field "val" 310 in the first node of the single-node link list 312 to produce a resulting value of "15" 314. Finally, on line 12, incEnds adds the values in the field "val" 314 of the first and last nodes of the single-node link list, in this case the same node 316 pointed to both by node pointer argument p and node pointer variable q to produce a value of "30," and places the resulting value "30" into the field "val" 318 of the single node 320 of the single-node link list.

Along with the C language routine "incEnds" shown in the first column 102 of FIG. 1 is an equivalent assembly-language routine in the second column 104 of FIG. 1. This assembly-language routine 104 might be produced by compilation of the C language routine incEnds by a C compiler. The assembly-language program 104 is written in a generic, pseudo-assembly-language. The first instruction on line 1 106 of the assembly-language program has the op code "sub" and three operands: (1) "sp," the destination register for the operation; (2) "sp," the register containing the value from which the value specified by the third argument will be subtracted; and (3) "#12" a literal representation of the integer value 12. This operation subtracts 12 from the value stored in the register "sp" and stores the resulting value back into the register "sp." Additional operations include: (1) "mov," an operation that moves a value from a source, specified by the second argument, to a destination specified by the first argument; (2) "cmp," an operation that compares two values; (3) "beq," an operation that causes a branch to another instruction within a program specified by a label if a previous cmp operation determined that the two compared values are identical; (4) "load," an operation that moves a value from a memory address, specified by the second argument, to a register, specified by the first argument; (5) "jmp," an operation that causes an unconditional jump to an instruction labeled by the label argument of the operation; (6) "add," an operation that adds two values specified in the second and third arguments and places the result into the destination specified by the first argument; and (7) "store," an operation that stores the value specified in the second argument into a memory location specified in the first argument. Arguments are specified as numbered registers, such as "r0" and "r1," as labels of instructions, such as "L1," as literal values, such as "#12," and as memory locations specified as an offset from the target memory address contained in a register, such as "4(sp)."

The lines of the C-language version of incEnds in column 102 of FIG. 1 are roughly horizontally correlated with equivalent lines or groups of lines in the assembly-language version of incEnds shown in column 104 of FIG. 1. For example, the test of whether the node pointer argument p is NULL, on line 4 of the C-language version of incEnds, corresponds to the "cmp" instruction on line 5 of the assembly-language version of incEnds. The initial four instructions and final five instructions of the assembly-language version of incEnds, on lines 1–4 and 19–23, respectively, are concerned with saving the values of registers prior to the execution of the algorithm specified by the source-language version of incEnds and restoring those values following execution of the algorithm specified by the source-language version of incEnds and returning to the calling routine or program. As another example, the increment of the value stored in the field "val" of the first node of the link list on line 11 of the C-language version of incEnds is equivalent to the three instructions on lines 13–15 of the assembly-language version of incEnds.

Several important concepts related to the operation of compilers can be illustrated by further consideration of the assembly-language version of incEnds shown in column 104 of FIG. 1. A basic block is a contiguous group of instructions that start with an instruction that may be the target of a branch or jump instruction or that may be reached during sequential execution of the instructions of the routine. No other instruction within a basic block, other than the first instruction, can be the target of a branch or jump instruction. No instruction within a basic block, other than the last instruction in the basic block, can transfer execution control from within the basic block to an instruction outside of the basic block. Thus, all the instructions in a basic block execute in sequence after the first instruction of the basic block is executed. The basic blocks in the assembly-language version of incEnds in column 104 of FIG. 1 are enclosed within dotted lines, such as dotted lines 108 and 110, and are labeled "B1" through "B6." The branch and jump instructions are highlighted by arrows, such as arrow 112 that shows the potential transfer of execution control from the "beq" instruction on line 6 to the "mov" instruction on line 19. Thus, for example, the "load," "cmp," and "beq" instructions on lines 8–10 together comprise basic block "B3" because the "load" instruction on line 8 is the target of the "jmp" instruction on line 12 and because the "beq" instruction on line 10 may transfer execution control to the "load" instruction on line 13. Many compiler techniques are simplified by considering basic blocks rather than individual instructions. In essence, a basic block can be considered a sort of meta instruction that can either be executed or not executed, depending on the flow of control during execution of a program.

Figure 4:
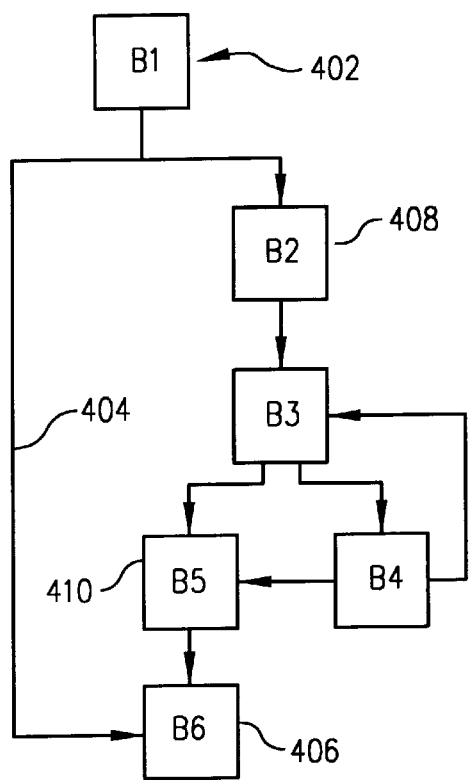
FIG. 4 shows a control flow graph that represents the assembly-language version of the routine "incEnds."

An important characterization of a program, or of routines or smaller units of instructions within a program, is a control flow graph. FIG. 4 shows a control flow graph that represents the assembly-language version of the routine "incEnds." The nodes in the flow control diagram of FIG. 4 correspond to basic blocks of the assembly-language program. The edges linking the nodes, shown by arrows in FIG. 4 such as arrow 404, represent possible transfer of execution control by the last instruction of one basic block to the first instruction of another basic block. For example, the "beq" instruction on line 6 of the assembly-language version of incEnds, the last instruction of basic block 1, may transfer control to the "mov" instruction on line 19, the first instruction of basic block 6. However, if the "beq" instruction on line 6 does not transfer execution control to basic block 6, execution control is automatically transferred to the "mov" instruction on line 7, the first instruction of basic block 2, by virtue of the sequential nature of program execution. Thus, in FIG. 4, the node representing basic block 1 402 is shown with edges pointing to basic block 6 406 and to basic block 2 408.

Figure 5:
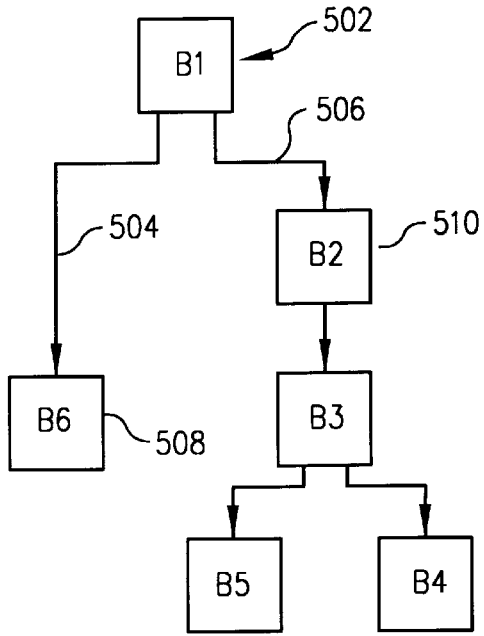
FIG. 5 shows the dominator tree for the assembly-language version of incEnds.

A second characterization of a program, or a routine or smaller unit of instruction within a program, related to the control flow graph is the dominator tree. FIG. 5 shows the dominator tree for the assembly-language version of incEnds. As with the control flow graph, the nodes of the dominator tree represent basic blocks. However, the edges of the dominator tree represent a dominance relationship between basic blocks. A basic block dominates another basic block if, for all possible flow control paths through a program during execution, the dominating basic block must execute prior to the basic block that it dominates. In FIG. 5, the node representing basic block 1 502 has no edges directed to it. This is because execution of the routine "incEnds" begins with basic block 1. Thus, basic block 1 dominates itself and every other basic block within the program.

In the dominator tree, only immediate dominance relations are shown. For example, as discussed above, basic block 1 immediately precedes execution of either basic block 2 or basic block 6. Because basic block 1 must execute immediately before either basic block 6 or basic block 2, no matter how control flows through routine "incEnds," basic block 1 immediately dominates both basic block 6 and basic block 2. Thus, in the dominator tree of FIG. 5, arrows 504 and 506 delineate an immediate dominance relationship between basic block 1, represented by node 502 and basic blocks 6 and 2, represented by nodes 508 and 510, respectively. Basic block 1 502 also indirectly dominates every basic block in the dominate tree, and immediately dominates itself, but the immediate dominance relationships are implied by the tree structure of the dominate tree, and neither indirect dominance nor self dominance relationships are explicitly shown by separate edges.

Figure 6:
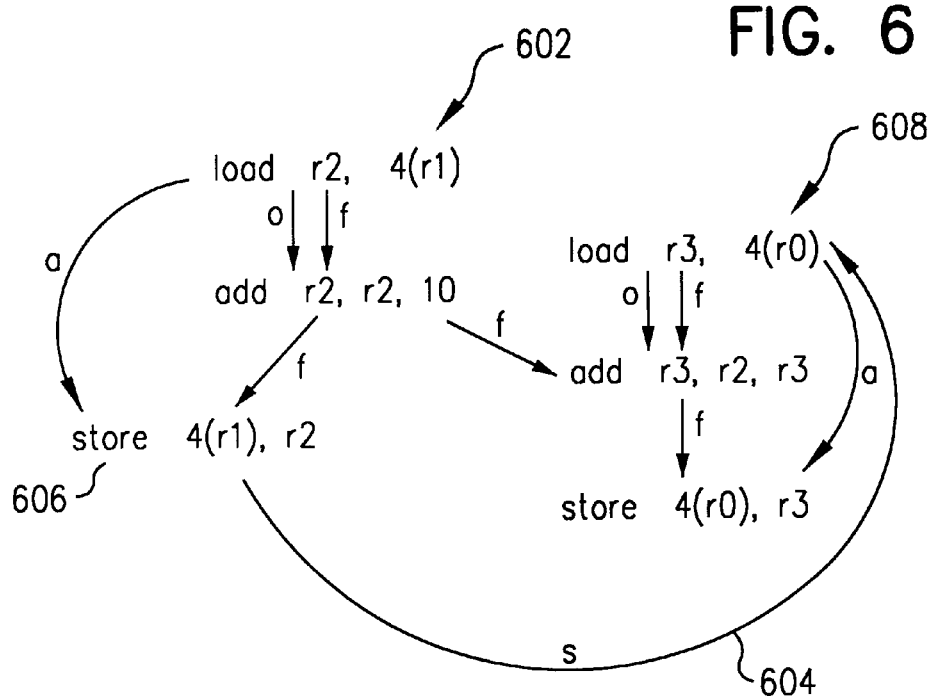
FIG. 6 shows the dependence DAG for basic block 5 of the assembly-language version of the routine "incEnds."

Certain compiler optimization techniques require the compiler to consider interdependencies between instructions within a basic block. An important tool for such considerations is a dependence DAG. FIG. 6 shows the dependence DAG for basic block 5 of the assembly-language version of the routine "incEnds." The nodes of a dependence DAG are instructions of the basic block. For example, node 602 of the dependence DAG showed in FIG. 6 corresponds to the "load" instruction on line 13 (FIG. 1, column 104) of the assembly-language version of the routine "incEnds." The edges, or arrows, that connect the nodes of a dependence DAG represent various types of dependence relations between instructions.

Four different types of dependence relations are easily illustrated in the assembly-language version of the routine "incEnds" shown in column 104 of FIG. 1. A flow dependence from a first instruction to a second instruction indicates that the second instruction makes use of a value that is defined by the first instruction. For example, there is a flow dependence, indicated by arrow 116, between the "sub" instruction on line 1 and the "mov" instruction on line 2. The "mov" instruction on line 2 stores the value in register "r0" into the memory location specified by an address stored in register "sp." Thus, the "mov" instruction on line 2 uses the value contained in the "sp" register. The value contained in the "sp" register used by the "mov" instruction on line 2 is determined or defined by the "sub" instruction on line 1 (FIG. 1, column 4), which stores a calculated result into register "sp."

A control dependence from a first instruction to a second instruction arises when the execution of the second instruction depends on a possible transfer of execution control brought about by execution of the first instruction. For example, a control dependence between the "beq" instruction on line 6 and the "mov" instruction on line 7 is indicated by arrow 118 in column 104 of FIG. 1.

An output dependence arises when a second instruction that may follow the execution of a first instruction defines a value that is also defined by the first instruction. For example, arrow 120 in FIG. 1 illustrates an output dependence between the "mov" instruction on line 7 and the "mov" instruction on line 11. Both "mov" instructions move a value into register "r0."

Finally, an anti-dependence arises when a second instruction that follows execution of a first instruction defines a value that is used by the first instruction. An anti-dependence between the "load" instruction on line 8 and the "mov" instruction on line 11 is indicated by arrow 122 in FIG. 1.

The dependency relationships between instructions within a basic block may always be described by a dependence DAG, since the instructions within a basic block are executed in strict sequence. No loops occur within a basic block. Therefore, no cycles arise in the graphical representation of the basic block. The dependency relationships between the nodes of FIG. 6 are labeled with the labels "f," "o," and "a" that designate a flow dependence, an output dependence, and anti-dependence, respectively. An additional type of dependence, designated in FIG. 6 as "s" will be discussed below.

During optimization, a compiler may, at times, be able to promote, or move, an instruction from one basic block to either a control equivalent basic block or to a basic block that immediately dominates the basic block in which the instruction resides. Two basic blocks, $B_x$ and $B_y$, are control equivalent when, for every possible execution path through a program, if $B_x$ is executed, then $B_y$ is executed, and vice versa. For example, as can be seen in FIG. 4, every time basic block B2 408 is executed, basic block B5 410 is executed, and every time basic block B5 410 is executed, basic block B2 408 is executed. Thus, basic blocks B2 408 and B5 410 of FIG. 4 are control equivalent.

Figure 7:
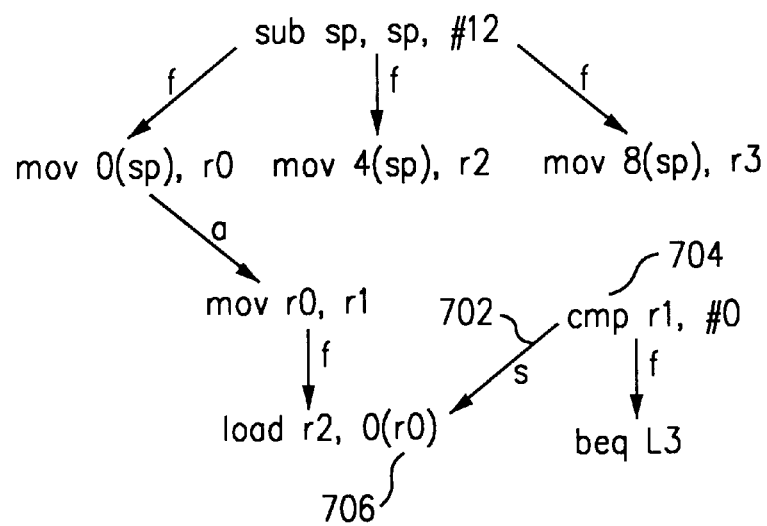
FIG. 7 shows the dependence DAG for basic block 1 of incEnds that results from promotion of the "mov" instruction on line 7 and the "load" instruction on line 8 of the assembly-language version of incEnds to basic block 1.

FIG. 7 shows the dependence DAG for a basic block that results from promotion of the "mov" instruction on line 7 and the "load" instruction on line 8 of the assembly-language version of incEnds in FIG. 1 to basic block 1. The same type of dependence relations are shown in FIG. 7 as are shown in FIG. 6. The dependence relation designated in FIG. 7 by "s" 702 between node 704 and node 706 will be discussed below.

Another concept used in analysis of control flow graphs is that of liveness. At the beginning of execution of a basic block, variables or registers that are used by one or more instructions in the basic block but that are not defined prior to their use in the basic block are considered to be live with respect to the basic block. Presumably, the live variables or registers are defined by one or more instructions in one or more preceding basic blocks. A related data structure sometimes associated with control flow graphs and other types of representations of programs is a def-use chain. A def-use chain is associated with each use of a variable or register by an instruction. The def-use chain associated with a particular use of a variable or register will include a pointer to either the last unambiguous definition the variable or register by a preceding instruction in the basic block, or, if none exists, the def-use chain will include pointers to the previous definitions of the variable or register that may reach the particular use of the variable or register.

FIG. 8 shows the assembly-language version of the routine "incEnds" in a slightly different format from the format of FIG. 1, as well as a modestly optimized version of the assembly-language version of the routine "incEnds." Between each instruction of the assembly-language version of the routine "incEnds," shown in column 802 of FIG. 8, is a labeled arrow that indicates the number of machine cycles necessary to execute the preceding instruction. For example, between the "sub" instruction on line 1 804 and the "mov" instruction on line 2 806 is an arrow 808 labeled with the number "1," indicating that the instruction "sub" can be executed in one machine cycle. The number of cycles required to execute a particular instruction differs for different types of computers and for different types of computer architectures. In this hypothetical example, most instructions execute in one machine cycle. However, as shown by the arrow 810 between the "load" instruction on line 8 812 and the "cmp" instruction on line 9 814, a load instruction requires three machine cycles for execution. In general, load instructions are more expensive in machine cycles than arithmetic or simple flow control instructions.

Most modern computer architectures provide for concurrent execution of two or more instructions. Superscalar computers automatically detect and schedule groups of instructions that can be concurrently executed at the hardware level. Very long instruction word ("VLIW") computers may automatically schedule instructions at the hardware level and may also be directed to concurrently schedule instructions programmatically. Compilers written to compile programs for both types of machines may take advantage either of the implicit concurrent scheduling instructions or of both implicit and explicit concurrent scheduling of instructions provided by the superscalar and VLIW architectures, respectively, to significantly optimize execution times for programs. If the routine "incEnds," shown in column 802 of FIG. 8, is executed sequentially, and the node pointer p is not NULL, then 26+7n machine cycles are required to execute the routine to completion, where n is the number of complete iterations of the while loop on lines 8–10 of the C-language version of the routine "incEnds" shown in column 102 of FIG. 1. The assembly-language instructions corresponding to the while loop are enclosed within in a bracket 816 in FIG. 8. The execution time 26+7n is easily determined by counting the number of cycles between each instruction.

By concurrently executing the three "mov" instructions on lines 2–4 and 19–21, respectively, the execution time can be decreased. A moderately optimized version of the routine "incEnds" is shown in column 818 in FIG. 8. Instructions that are concurrently executed are all concatenated together on a single line and separated by "/" symbols. For example, three "mov" instructions that occur in lines 2–4 of the non-optimized version of the routine "incEnds" are concurrently executed on line 2 of the moderately optimized version of the routine "incEnds." By counting the machine cycle times between the instructions, it can easily be determined that the moderately optimized version of incEnds shown in FIG. 8 will execute in 21+6n machine cycles, where n is the number of complete iterations of the while loop designated by bracket 818 (FIG. 8).

An optimizing compiler may perform many different types of optimizations on the routine "incEnds." FIG. 9 shows a further optimized version of the routine "incEnds" that include both a control speculated load instruction and a data speculated load instruction arising from relocation of two different load instructions. Although the optimizations shown in FIG. 9 do not necessarily correspond to optimizations that might be performed by any particular compiler, they serve to illustrate certain features associated with certain types of optimizations.

In the further optimized version of incEnds, shown in FIG. 9, the "mov" and "load" instructions on lines 5 and 6 of the moderately optimized version of incEnds of FIG. 8 have been combined on line 3 of the further optimized version of incEnds in FIG. 9 to concurrently execute directly after the combined "mov" instructions on line 2. The relocation of the "load" instruction makes the "load" instruction a control speculated load instruction because the "load" instruction is now executed prior to the "cmp" instruction on line 4 that previously guarded the "load" instruction. In the previous versions of the routine "incEnds," the "load" instruction followed execution of the "cmp" instruction on line 4. The "cmp" instruction of line 4 of the further optimized version of incEnds, shown in FIG. 9, corresponds to the test of the node pointer argument p on line 4 of the C-language version of incEnds (column 102 of FIG. 1). In the C-language version of incEnds, no statements subsequent to the statement on line 4 are executed if the node pointer argument p is NULL. However, in the further optimized version of incEnds shown in FIG. 9, the "load" instruction on line 3, corresponding, in part, to the statement on line 9 (column 102 of FIG. 1) of the C-language version of incEnds within the while loop, is executed whether or not the node pointer argument p is NULL. In general, this makes no difference, because if the incoming node pointer argument p is NULL, then the "beq" instruction on line 6 (column 104 of FIG. 1) transfers execution control to line 19, and the result of the "load" instruction on line 3 is simply discarded. By moving the "load" instruction towards the beginning of the routine, execution of the "load" instruction can overlap with the execution of the "mov" instruction with which it is combined on line 3 in order to save execution time. In general, this represents a valuable optimization.

If the node pointer argument p is never NULL, the optimized version of incEnds, shown in FIG. 9, will execute, with respect to the first ten lines of the C-language version of incEnds shown in FIG. 1, identically to the non-optimized versions of incEnds shown in FIGS. 1 and 8. However, if the node pointer argument p is NULL, the "load" instruction on line 3 of the further optimized version of incEnds shown in FIG. 9 will invariably cause an exception. Exceptions transfer execution control to an exception handling routine that may either handle the exception of may generate an error message and terminate execution of a routine. In the case of an attempt to address memory through a NULL pointer, the exception is generally fatal and the routine terminates. Thus, in the case where incEnds is called with a NULL pointer argument p, the optimized version of incEnds shown in FIG. 9 will execute dramatically differently than the non-optimized and moderately optimized versions of incEnds shown in FIGS. 8 and 1, respectively.

A second optimization shown in FIG. 9 is the combination of two "load" instructions that reside on lines 10 and 13 in the moderately optimized version of incEnds shown in column 18 of FIG. 8 into a single instruction on line 9 of the further optimized version of incEnds shown in FIG. 9. By concurrently executing both load instructions, the further optimized version of incEnds saves three machine cycles. However, the second load instruction shown on line 9 902 is now executed prior to the "store" instruction of line 11. In previous versions of incEnds, shown in FIGS. 8 and 1, execution of that second load instruction followed execution of the "store" instruction on line 11. The first load instruction 904 on line 9 retrieves the field "val" from the node pointed to by the node pointer argument p, one of the assembly-language instructions corresponding to the assignment on line 11 of the C version of incEnds shown in column 102 of FIG. 1. The second load instruction 902 on line 9 corresponds to retrieval of the field "val" from the node pointed to by the node pointer variable q and is one of the assembly-language instructions corresponding to the assignment on line 12 of the C-language version of incEnds shown in column 102 of FIG. 1. The store instruction on line 11 of the further optimized version of incEnds shown in FIG. 9 is the final assembly-language instruction corresponding to the assignment on line 11 of the C-language version of incEnds shown in column 102 of FIG. 1. In essence, the optimizations of FIG. 9 have caused the values stored in the val fields of both the first and last nodes of a linked list of nodes to be concurrently retrieved prior to assignment of new values to either of the nodes.

In general, when there is more than one node on a link list of nodes that is processed by the routine "incEnds," the concurrent execution of the two loads in the further optimized version of incEnds in FIG. 9 will be equivalent to the separate execution of the two loads in the non-optimized version of incEnds. However, in the case of a linked list having only a single node, the result of execution of the further optimized version of incEnds shown in FIG. 9 will differ markedly from the non-optimized and moderately optimized versions of incEnds shown in FIGS. 1 and 8, respectively.

Figure 2:
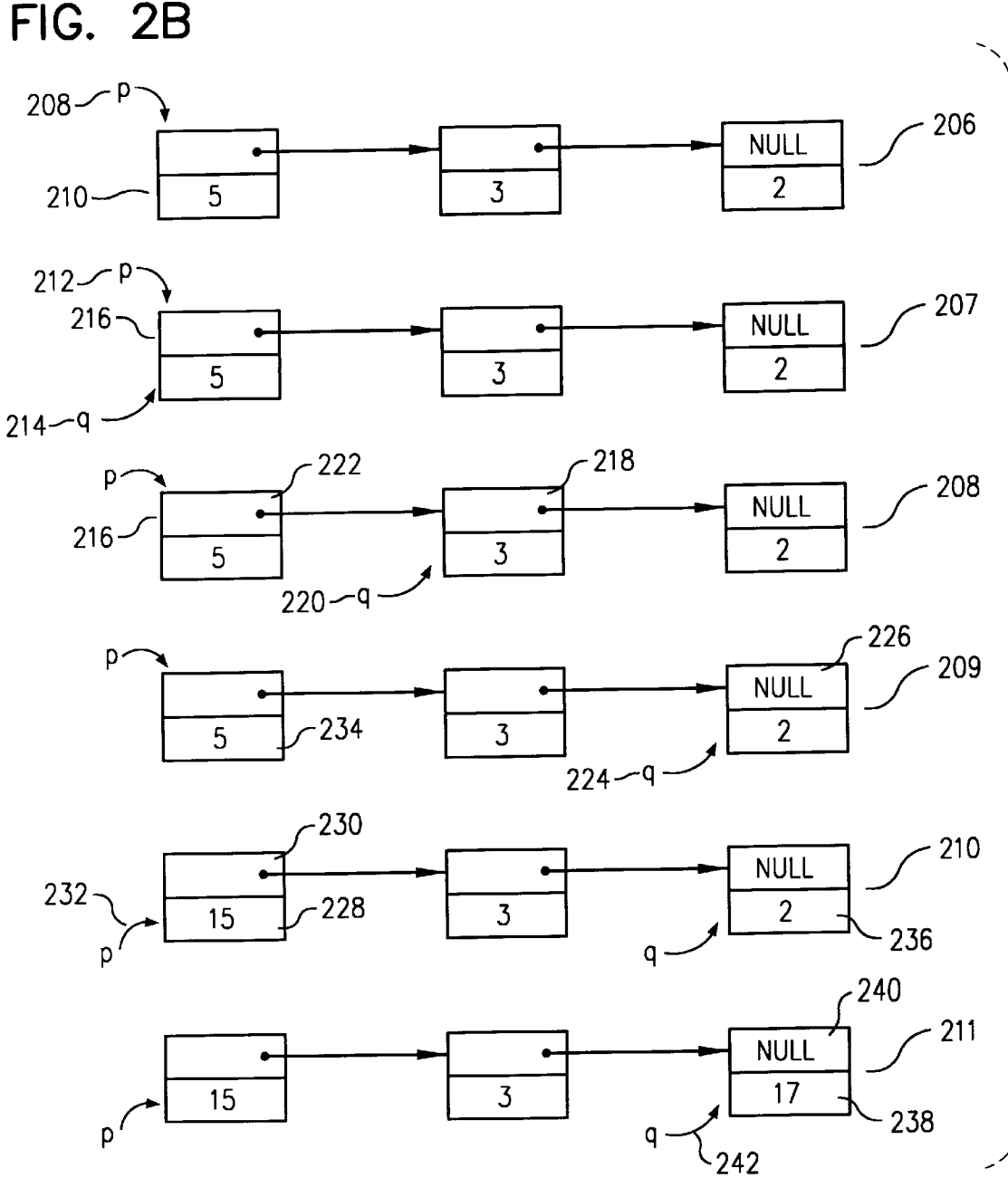
FIG. 2A illustrates a single node of a linked list.
FIG. 2B illustrates the operations performed by the routine "incEnds" on a linked list comprising three nodes.
Figures 10, 11A, 11B:
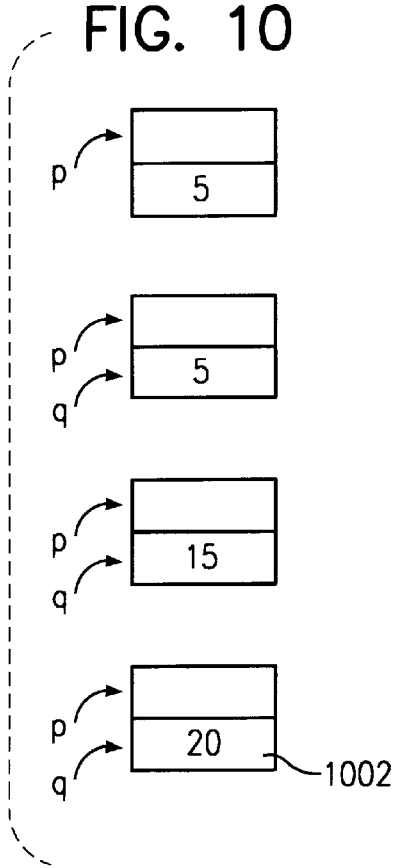
FIG. 10 illustrates execution of the further optimized version of incEnds for the single-node linked list of FIG. 3.
FIGS. 11A–B show two memory-resident tables that are maintained by a computer compliant with the HPL PlayDoh architecture.

FIG. 10 shows execution of the further optimized version of incEnds, shown in FIG. 9, for the single-node linked list of FIG. 3. Because the second "load" instruction 902 of the combined instruction on line 9 is executed before the "store" instruction on line 11, the initial value stored in the field "val" of the first node of the link list, rather than the value resulting from the assignment on line 11 of the C-language version of incEnds shown in column 102 of FIG. 1, is used for the addition that occurs in the statement on line 12 of the C-language version of incEnds. Thus, whereas the non-optimized version of incEnds adds the incremented value contained in the field of the only node on the linked list to itself and assigns the result to the field "val" of that node, the further optimized version of incEnds shown in FIG. 9 adds the previous value of the field "val" to the incremented value. As a result, the final value stored in the field "val" 1002 in FIG. 2 is "20," whereas the final value stored in the field "val" 318 in FIG. 3 is "30." Thus, although moving the second "load" instruction 902 upward in the further optimized version of incEnds and combining it with a previous "load" instruction saved three instruction cycles, and generally produced a correct result, in cases where the node pointer argument p and the node pointer variable q both point to the same node, the optimization produces incorrect behavior. The "store" instruction on line 11 represents a potentially aliasing store instruction. Thus, a subsequent "load" instruction can be safely moved to a position prior to the "store" instruction only if the "load" instruction retrieves a value from a target memory address that is different from the target memory address into which the "store" instruction places a value. If the target memory addresses are the same for both the "load" and "store" instructions, then after optimization, the "store" instruction aliases the contents of the target memory address and the "load" instruction incorrectly loads a value that would, in the non-optimized version of the program, have been defined by the prior-executing "store" instruction. A "load" instruction that is moved across a potentially aliasing store instruction as a result of an attempted optimization is called a data speculated load.

Note that the further optimized version of incEnds shown in FIG. 9, which runs in 17+5n machine cycles, is significantly faster than the moderately optimized version of incEnds and the non-optimized versions of incEnds shown in FIG. 8 and FIG. 1, respectively. Thus, both control speculation and data speculation optimizations can significantly enhance the execution efficiency of a compiled program. However, unless the errors that are potentially introduced by control and data speculation are handled in some fashion, these optimizations will produce a potentially incorrect program.

Returning to FIG. 6, the dependence 604 designated by the label "s" can now be seen to describe the speculative dependence relationship between the "store" instruction that occurs on line 15 (FIG. 1, column 104) and the "load" instruction 608 that occurs on line 16 (FIG. 1, column 104) of the assembly-language version of incEnds subsequent to the store instruction on line 15. The speculative dependence relationship indicates that the "load" instruction 608 may not be scheduled for execution prior to execution of the "store" instruction 606 unless the data speculation that may potentially accompany such a scheduling change is somehow handled. The dependence graph edge 702 in FIG. 7, designated by "s," can now be seen to represent a control speculation dependence between the "cmp" instruction 704 that occurs on line 5 (FIG. 1, column 104) of the assembly-language version of incEnds and the "load" instruction 706 that occurs on line 8 (FIG. 1, column 104). This control speculation dependence 702 indicates that the "load" instruction 706 can be scheduled for execution ahead of the "cmp" instruction 704 only in the case that the possible errors resulting from scheduling the "load" instruction ahead of the "cmp" instruction are somehow handled during execution of the resulting optimized program.

Overview of Relevant HPL PlayDoh Architecture Features

The features described below are described in detail in "HPL PlayDoh Architecture Specification: Version 1.0", cited above. Certain architectural features and machine instructions will be described in this section in order to facilitate subsequent discussions of a preferred embodiment of the present invention, including numerous programming examples. It should be noted that the present invention may be implemented on any number of different types of computer architectures. The implementation of a preferred embodiment described below takes advantage of certain architectural features of the HPL PlayDoh architecture. However, similar types of features in other architectures may be employed to implement the present invention, or, in the most general case, certain of the features described below may be implemented at the software level.

FIGS. 11A and 11B show two hardware-accessible memory-resident tables that are maintained at the hardware level by a computer compliant with the HPL PlayDoh architecture. The memory conflict table, shown in FIG. 11A, may be used to keep track of recent memory accesses in order to detect overwriting of the contents of a memory address that is accessed by a data speculated load instruction. Each entry in the memory conflict table includes an indication of the register that was the target of a memory access instruction, the address of the memory location that was accessed, and an indication of whether the memory access is still valid. Thus, memory conflict table 1102 contains a register column 1104, a memory address column 1106, and a valid column 1108. Note that the memory address is an absolute memory address after any transformations resulting from hardware level memory mapping and other indirections.

The exception log table, shown in FIG. 11B, contains entries corresponding to exceptions generated by the execution of certain instructions. Each entry in the exception log table 1110 contains an indication of the register that was a target of the instruction that generated the exception, an indication of the exception that occurred, the contents of the program counter ("PC") register at the time of the exception, and any other status information including, for example, the contents of other registers, that is necessary to later duplicate the state of the machine at the time of the exception. Thus, the exception log table 1110 in FIG. 11B contains a register column 1112, an exception code column 1114, a PC column 1116, and a column for other status information 1118.

As with other features of the HPL PlayDoh architecture, the exact contents and format for both the memory conflict table and the exception log table may vary in different implementations. Implementation of the present invention is not dependent on how the information is stored, but instead, on the general functionality that is provided either by special features of the HPL PlayDoh architecture that are described in this section or by other hardware or software implementations of similar features.

A subset of the HPL PlayDoh architecture, sufficient for understanding the code examples and implementation details to be discussed below, is described in the following C++-like pseudo-code class definitions. The class definitions allow for an algorithmic description of certain HPL PlayDoh machine instructions. This approach is used for conciseness and clarity. Machine architectures are not generally described in high-level programming language code, and are implemented in hardware and firmware, rather than in software routines. However, for the purposes of the following discussion, an algorithmic description of a subset of the HPL PlayDoh architecture provides a clear and accurate foundation for the discussion that follows.

```
1   general_register
2   {
3      setContents(int val);
4      int getContents();
5      setSpeculative(Bool s);
6      Bool getSpeculative ();
7   }
8
9   predicative_register
10  {
11     set Contents (Bool val);
12     Bool getContents();
13     setSpeculative (Bool s);
14     Bool getSpeculative();
15  }
16
17  exception
18  {
19     Bool raise();
20  }
21
22  processor
23  {
24     private:
25        signal (exception e);
26        signal (general_register r);
```

-continued

```
27      generate (general_register,exception e, status s);
28      exception fetchMemory (general_register & dest, general_register source);
29      exception storeMemory (general_register dest, general_register source);
30      logReference (general_register t, general_register a);
31      Bool valid Reference (general_register t);
32      invalidReferencesT (general_register t);
33      invalidReferencesA (general_register a);
34
35   public:
36      L (general_register & dest, general_register a);
37      LE (general_register & dest, general_register a);
38      LDS (general_register & dest, general_register a);
39      LDS.E (general_register & dest, general_register a);
40      LDV (general_register & dest, general_register a);
41      LDV.E general_register & dest, general_register a);
42      S (general_register dest, general_register r);
43      BRDV (general_register dest, general_register t);
44      CMPP (general_register & dest, compare_condition);
45      BRCT (general_register dest, predicate_register p);
46      BR (general_register);
47      ADD (general_register & dest, general_register i, general_register j);
48      ADD.E (general_register & dest, general_register i, general_register j);
49      L. (general_register & dest, general_register a);
50      L.E.P (general_register & dest, general_register a, predicate_register p);
51      BRDV.P (general_register dest, general_register t);
52      ADD.P (general_register & dest, general_register i; general_register j,
53         predicate_register p);
54      INVR (general_register t);
55   }
```

The classes "general_register" and "predicative_register," declared above on lines 1–7 and 9–15, respectively, describe certain features of the general and predicative registers defined by the PlayDoh architecture. For the purposes of this discussion, a general_register can be considered to be an integer register, and a predicative register can be considered to be a special Boolean register. Both types of registers include, or are associated with, at least one extra bit, called a speculative tag. The four methods shown for each class of register, on lines 3–6 and 11–14, respectively, describe the basic register operations carried out by hardware and firmware that allow the contents of a register to be set and retrieved and that allow the speculative tag of a register to be set and retrieved.

The class "exception," declared on lines 17–20, represents one of a number of different types of machine exceptions that may be generated, signaled, and handled during execution of machine instructions by a PlayDoh-compliant computer. A single method "raise," defined on line 19, returns a Boolean value indicating whether or not the exception represented by a particular instance of the class "exception" needs to be handled at run-time. As with the register classes, the exception class is declared in this high-level language description of a subset of the PlayDoh architecture in order for the operation of particular instructions to be described algorithmically below.

The class "processor," declared on lines 22–55, describes a subset of processor operations. The private methods, declared on lines 25–33, describe a subset of internal operations carried out by the processor during execution of machine instructions and the public methods, declared on lines 36–54, describe a subset of the machine instructions provided by a computer system compliant with the PlayDoh architecture. The subset of internal processor operations described in the class "processor" include operations to signal and generate exceptions, operations to fetch a value from memory and to store a value in a memory location, and a number of operations for updating and maintaining the contents of the memory conflict table and exception log table described in FIGS. 11A and 11B, respectively.

Under the PlayDoh architecture, the signaling and generation of signals are separate operations. An exception is generated when the processor, during the execution of an instruction, encounters any of a number of different problems. For example, an attempt to retrieve a value from an invalid memory address by execution of a load instruction, or an attempt to store a value into an invalid memory address, by execution of a store instruction, both result in generation of an exception. Once an exception has been generated, the processor may then signal the exception either immediately, or may signal the exception during execution of a subsequent instruction. Signaling an exception generally involves invocation of some kind of exception handler. The exception handler may attempt to overcome the problem, as, for example, by faulting in an absent virtual memory page, or the exception handler may generate appropriate diagnostic information and terminate execution of the program. The first signal method, defined on line 25 of the above pseudo-code class definitions, represents the fact that a processor can signal a particular generated exception. The second signal method, declared on line 36, indicates that a processor may signal the exception that is associated in the exception log table, displayed in FIG. 11B, with a particular register. The register is supplied as an argument to the second signal method. The generate method, declared on line 27, represents the fact that a processor may generate an exception, resulting in the exception being stored in the exception log table shown in FIG. 11B. The register that was the target of the instruction that is executed when an exception arises, the type of exception, and various status information that describe the state of the process at the time of the exception, are supplied to the generate method as arguments.

The method "fetchMemory," declared on line 28, and the method "store memory," declared on line 29, represent the fact that a processor can retrieve a value contained in a memory location and place that value into a general register, in the case of fetchMemory, and store a value contained in a general register into a memory location, in the case of store memory. The address of the memory location that is the source or target of these memory operations is also stored in a general register and supplied as an argument.

A processor may conduct various operations to upgrade and maintain the memory conflict table, shown in FIG. 11A. The processor may place a new entry into the memory conflict table via the method "logReference," declared on line 30. The processor may determine whether a particular general register is associated with either a valid memory reference or with no memory references via the method "validReference," declared above on line 31. The processor may invalidate all references in the memory conflict table associated with the particular general register via the method "invalidateReferencesT," declared as line 32. The processor may invalidate all references to a particular memory address stored in the memory conflict table via the method "invalidateReferencesA," declared on line 33.

The public methods declared for the processor class, declared on lines 36–54, represent a subset of the machine instructions supported by a computer compliant with the PlayDoh architecture. The first six instructions, "L," "L.E," "LDS," "LDS.E," "LDV," and "LDV.E," are all load instructions that retrieve contents of a memory location addressed by the contents of the argument "a" and place the contents of the memory location into the general register "dest." These instructions will be described algorithmically below.

The instruction "S," declared on line 42, stores the contents of a general register, supplied as argument "r," into the memory location addressed by the contents of the general register "dest," supplied as the first argument. The instruction "BRDV," declared on line 43, is a conditional branch that branches to the instruction designated by the first argument "dest" when the general register, supplied as argument "t," is associated with an exception or an invalid memory reference. Both the instruction "S" and the instruction "BRDV" are described algorithmically below.

The instruction "CMPP," declared on line 44, is a general compare instruction that branches to the instruction indicated by the first argument "dest" when the condition supplied as the second argument, "compare_condition," evaluates to TRUE. Note that, under the PlayDoh architecture, the compare condition is represented as a Boolean relation between values stored in a number of different registers. However, for the purposes of this discussion, the details of an actual CMPP instruction are not relevant. The instruction "BRCT," declared on line 45, branches to an instruction indicated by the argument "dest" when the value in the predicative register "p" is true. The instruction "BR," declared on line 46, is an unconditional branch to a designated instruction.

The instruction "ADD," declared on line 47, is an add instruction that adds the contents of the registers "i" and "j" and places the result in the register "dest." The instruction "ADD.E," declared on line 48, is an eager-mode variation of the previously declared add instruction. Most instructions in the PlayDoh architecture have eager-mode equivalents. If none of the speculative tags associated with the source registers of an eager-mode instruction, registers "i" and "j" in the case of the ADD.E instruction, are set, then execution of the instruction proceeds normally when the instruction does not generate an exception. When the instruction does generate an exception, the instruction sets the speculative tag of the destination register to TRUE, but does not signal the exception. If, on the other hand, the speculative tag of one or more of the source registers are set, then the instruction does not execute, but instead sets the speculative tag of the destination register. Thus, an eager-mode instruction defers the signaling of an exception generated during execution of the instruction and propagates an exception that was generated by a previously executed instruction by copying the speculative tag from source registers to the destination register. Non-eager-mode instructions immediately signal exceptions that are generated during execution of the instruction and immediately signal the exception associated with a source register having a speculative tag set to TRUE. Thus, non-eager-mode instructions neither defer nor propagate exceptions.

The next four instructions, "L.P," "L.E.P," "BRDV.P," and "ADD.P," declared on lines 49–53, are predicated versions of the instructions "L," "L.E," "BRDV," and "ADD," declared in preceding lines. Predicated instructions have the same form and semantics of non-predicated instructions except that they include an additional predicative register argument "p" that indicates whether or not the instructions should be executed. In the case of the instruction "ADD.P," the add operation is performed when the argument "p" evaluates to TRUE, and is not performed when the argument "p" evaluates to FALSE. Finally, the instruction "INVR," declared on line 54, directs the processor to invalidate any entries in the memory conflict table, displayed in FIG. 11A, associated with the register supplied as argument "t."

The following eight pseudo-code-routines algorithmically describe, in detail, the above declared PlayDoh instructions "L," "L.E," "LDS," "LDS.E," "LDV," "LDV.E," "S," and "BRDV." Again, the instructions are implemented in hardware and firmware on an actual computer system. This algorithmic description is meant only to clarify and facilitate the discussion of subsequent code examples and implementation details.

///
///
///

```
1    L (general_register & dest, general_register a);
2    {
3        exception e;
4
5        if (a.getSpeculative() signal (a);
6        e = fetchMemory (dest, a);
7        if (e.raise() signal (e);
8    }
```

The load instruction "L," shown immediately above, is a simple, non-eager mode retrieval of the contents of a memory location, specified in register argument "a," and storage of the retrieved value into the register specified by the argument "dest." If the speculative tag of the source register "a" is set, as detected on line 5, the instruction "L" signals the exception associated with register "a." Otherwise, the struction "L" fetches the value stored in the memory location specified by register "a" into the register "dest." If an exception occurs during the memory fetch that needs to be handled by the processor, the instruction "L" immediately signals the exception on line 7.

```
1    L.E (general_register & dest, general_register a);
2    {
3        exception e;
4
5        if (a.getSpeculative()) dest.setSpeculative (TRUE);
```

```
 6      else
 7      {
 8          e = fetchMemory (dest, a);
 9          if (e.raise)))
10          {
11              dest.setSpeculative(TRUE);
12              generate (dest, e, status);
13          }
14      }
15  }
```

The instruction "L.E," shown immediately above, is the eager-mode version of the instruction "L." If the speculative tag of the source register "a" is set, as detected on line 5, the instruction "L.E" simply sets the speculative tag of the destination register "dest" and returns. Otherwise, the instruction "L.E" conducts the memory fetch on line 8. If an exception that needs to be handled is generated during the memory fetch, as detected on line 9, then the instruction "L.E" sets the speculative tag of the destination register, on line 11, and generates the exception on line 12, resulting in the exception being logged in the exception log table of FIG. 11B.

```
 1  LDS (general_register & dest, general_register a);
 2  {
 3      exception e;
 4
 5      if (a.getSpeculative))) signal (a);
 6      e = fetchMemory (dest, a);
 7      invalidateReferencesT (dest);
 8      if (e.raise))) signal (e);
 9      else logReference (dest, a);
10  }
```

The instruction "LDS," shown immediately above, is a load instruction designed to address the data speculation problems discussed above. As with any non-eager-mode instruction, the instruction "LDS" signals an exception associated with the source register "a" if the speculative tag of the source register "a" is set, on line 5. The instruction "LDS" retrieves, on line 6, the value in the designated memory location and places the value in the destination register "dest" and invalidates, on line 7, any current entries in the memory conflict table, shown in FIG. 11A, associated with the target register "dest." If an exception that needs to be handled is generated by the fetch operation, the instruction "LDS" immediately signals the exception on line 8. Otherwise, the instruction "LDS" enters a new reference into the memory conflict table to reflect the memory fetch that was just concluded on line 6. Depending on the size of the memory conflict table, and other implementation details, a computer system may or may not actually place a new entry into the memory conflict table. However, for the purposes of this discussion, it can be assumed that the memory conflict table is sufficiently large, and that old or stale references are garbage collected such that the instruction "LDS" always succeeds in entering a new entry into the memory conflict table on line 9.

```
 1  LDS.E (general_register & dest, general_register a);
 2  {
 3      exception e;
 4
 5      if (a.getSpeculative()) dest.setSpeculative(TRUE);
 6      else
 7      {
 8          e = fetchMemory (dest, a);
 9          invalidateReferencesT (dest);
10          if (e.raise)))
11          {
12              dest.setSpeculative(TRUE);
13              generate (dest, e, status);
14          }
15          else logReference (dest, a);
16      }
17  }
```

The instruction "LDS.E," shown immediately above, is the eager-mode variation of the instruction "LDS." The instruction "LDS.E" differs from the instruction "LDS" principally in that, rather than signaling an exception that occurs during the memory fetch, as in the case of the instruction "LDS," the instruction "LDS.E" instead sets the speculative tag of the register "dest" and generates, but does not signal the exception on lines 12 and 13, respectively.

```
 1  LDV (general_register & dest, general_register a);
 2  {
 3      exception e;
 4
 5      if (a.getSpeculative))) signal (a);
 6      if (! validReference (dest, a);
 7      {
 8          e = fetchMemory (dest, a);
 9          if (e.raise))) signal (e);
10          else invalidateReferenceT (dest);
11      }
12  }
```

The instruction "LDV," shown immediately above, essentially checks on line 8, the memory conflict table to determine whether the register "dest" already contains the value contained in the memory location identified by register "a." If so, the instruction "LDV" does nothing. Otherwise, the instruction "LDV" retrieves the value from memory at the memory location indicated by register "a" and places the retrieved value in the register "dest," invalidating any previous entries in the memory conflict table if the memory fetch succeeds, and immediately signaling an exception if the memory fetch does not succeed.

```
 1  LDV.E (general_register & dest, general_register a);
 2  {
 3      exception e;
 4
 5      if (a.getSpeculative()) dest.setSpeculative(TRUE);
 6      else
 7      {
 8          if (!validReference (dest, a))
 9          {
10              e = fetchMemory (dest, a)
11              if (e.raise())
12              {
13                  dest.setSpeculative(TRUE);
14                  generate (dest, e, status);
```

-continued

```
15        }
16            else invalidateReferenceT (dest);
17        }
18    }
19 }
```

The instruction "LDV.E," shown immediately above, is the eager-mode variation of the instruction "LDV." In the case where a memory fetch is required, as detected by instruction "LDV.E" on line 8, an exception that arises during the memory fetch is generated, but not immediately signaled, and the speculative tag of the register "dest" is set. Thus, as with all eager-mode instructions, the instruction "LDV.E" defers exceptions that arise during execution.

```
1    S (general_register & dest, general_register r);
2    {
3        exception e;
4
5        e = storeMemory (dest, r);
6        if (e.raise()) signal (e);
7        else invalidateReferenceA (dest);
8    }
```

Instruction "S," shown immediately above, stores the value contained in the register "r" into the destination register "dest." After a machine level store, the instruction "S" immediately signals any exceptions. If there are no exceptions, the instruction "S" invalidates any entries in the memory conflict table with memory addresses equal to the memory address contained in the register "r."

```
1    BRDV (general_register & dest, general_register t);
2    {
3        if (! validReference (t) || t.getSpeculative()) goto dest;
4        else invalidate ReferenceT (t);
5    }
```

The instruction "BRDV," shown immediately above, is a conditional branch instruction where the condition relates to the speculative tag of the register "t" and to the presence of a valid entry associated with register "t" in the memory conflict table. If there is an invalid reference in the memory conflict table associated with register "t" and no valid reference associated with register "t," or if the speculative tag of register "t" is set, as detected on line 3, then instruction "BRDV" causes execution to jump to the instruction indicated by the register "dest." Otherwise, instruction "BRDV" invalidates all references in the memory conflict table associated with register "t."

Again, the pseudo-code descriptions of the various instructions and operations of a computer system compliant with the PlayDoh architecture have been presented only for clarity and brevity. The details of the hardware and firmware implementations may vary substantially between different types of computer systems compliant with the PlayDoh architecture. Furthermore, the present invention does not depend on, or require, the PlayDoh architecture or specific details of the implementation of the PlayDoh architecture instructions described above. Instead, this overview of the PlayDoh architecture is presented only in order to serve as background for the code examples and implementation of a preferred embodiment, presented below.

A Technique for Unified Control and Data Speculation with Recovery Code

The method and system of the present invention is concerned with scheduling control speculated and data speculated instructions. As discussed above, scheduling speculated instructions may produce potentially unsafe optimized executable programs, because exceptions and memory fetches may occur that do not occur in executable programs in which the instruction order corresponds to the order defined by the source-language program from which the executable program is compiled. In this and following sections, the discussion of the present invention will relate most particularly to scheduling of unsafe load instructions. However, the present invention is not limited to the scheduling of unsafe load instructions, but may instead be applied to scheduling of many different types of instructions that can produce operation of an optimized executable program different from the operation defined by the source-language program from which the optimized executable program is produced by compilation.

The three-line code extract, shown below, illustrates, in HPL PlayDoh architecture assembly-language instructions, the problem of control speculation:

```
1    B1:    p = CMPP (condition)
2           x = L(y) if p
3           z = ADD (x,w) if p
```

Note that the assembly-language in this and in following code extracts will use a different assembly-language format for the various PlayDoh architecture instructions that were described in pseudo-code in the previous section. For example, the CMPP instruction, on line 1, takes one argument, the compare condition, rather than two arguments in the pseudo-code description, and returns a Boolean value that is explicitly assigned to the register "p," represented in the pseudo-code description in the previous section as the first argument to the CMPP instruction. As another example, the syntax "x=L(y) if p" on line 2 corresponds to the instruction "L.P(x,p)" in the pseudo-code description of the previous section. However, the semantics of the HPL PlayDoh architecture instructions are identical to the semantics of the assembly-language format instructions. On line 1, the predicative register "p" is set to a Boolean value via a CMPP instruction. On line 2, a predicative load instruction loads the value stored in the memory address identified by the contents of register "y" into register "x" if the value of register "p" evaluates to true. On line 3, a predicative add instruction adds the values in registers "x" and "w" and places the sum into register "z" if the predicative register "p" evaluates to TRUE.

Control speculation results from the load instruction on line 2 being moved to a location prior to the CMPP instruction on line 1. When an exception is generated and signaled by the load instruction after which the following CMPP instruction evaluates the compare condition and returns a Boolean value of FALSE, will produce a different execution behavior than in the above three-line code extract. An exception will be generated and signaled by the relocated local instruction that, in the above code extraction, is guarded by the CMPP instruction. This is exactly analagous to the control speculative relocation of the first load instruction in the further optimized version of the routine "incEnds," shown in FIG. 9.

The technique to handle control speculative relocation of the load instruction in the above code extract is shown below:

| | | | | | |
|---|---|---|---|---|---|
| 1 | B1: | x = L.E (y) | 1 | Recovery: | x = L(y) |
| 2 | | z = ADD.E (x,w) | 2 | | z = ADD (x,w) |
| 3 | | p = CMPP (condition) | 3 | | BR (Next) |
| 4 | | BRDV (Recovery,x) if p | | | |
| 5 | Next: | | | | |

In this case, the non-eager mode load instruction on line 2 of the original code extract, along with the non-eager mode add instruction on line 3 of the original extract, have been changed to equivalent eager-mode instructions and placed ahead of the CMPP instruction. A BRDV instruction has been inserted at the position originally inhabited by the load instruction on line 4. The BRDV instruction may cause control to flow to the recovery block, labeled by the label "Recovery," in the second column of the above modified code extract. When no exception is generated during execution of the load instruction on the first line of the modified code extract, the load and add instructions execute in identical fashion to the load and add instructions in the original code extract. The CMPP instruction then executes and returns the same Boolean value as the CMPP instruction returns in the original code extract, and the BRDV instruction becomes a no op, regardless of the Boolean value stored in register "p" by the CMPP instruction on line 3. Thus, if no exception is generated by the load instruction on line 1 of the modified code extract, execution of the modified code extract is equivalent to execution of the original code extract.

If, on the other hand, the eager-mode load instruction on line 1 of the modified code extract generates an exception, that exception is entered into the exception log table and the speculative tag of register "x" is set by the eager-mode load instruction. Then, the eager-mode add instruction on line 2 of the modified code extract simply propagates the speculative tag of register "x" to register "z." If the CMPP instruction returns a Boolean value TRUE, the BRDV instruction detects the fact that the speculative tag of register "x" is set, and causes control to flow to the recovery block in the second column of the above modified code extract. On line 1 of the recovery block, a non-eager mode version of the load instruction is executed with the same source and target registers that both still contain the same values that they contain when the original eager-mode load instruction is executed, on line 1, and, presumably, the same exception that is generated during the execution of the eager-mode instruction on line 1 is again generated and immediately signaled and handled by the non-eager mode version of the load instruction. If the exception is not terminal, after the exception is handled, the add instruction on line 2 of the recovery block is executed, and the unconditional branch returns control to the instruction following the BRDV instruction in the first column of the modified code extract. In the case that the CMPP instruction returns a Boolean value TRUE, the exception is generated and signaled just as it is in the original code extract.

If an exception arises during the execution of the eager-mode load instruction on line 1 of the modified code extract, and the CMPP instruction returns a FALSE value, the BRDV instruction does nothing, since it is predicated by the register "p," and processing continues with the instruction labeled "Next." Presumably, the register "x" will be defined in a subsequent instruction, at which point the speculative tag of register "x," set by the eager-mode load instruction on line 1, will be cleared. Thus, the modified code extract, shown above, correctly handles any error conditions that arise from the control speculative relocation of the load instruction to a position prior to the CMPP instruction that originally guarded the load instruction.

The following three-line code extract will be used as an example of a data speculative code rearrangement:

| | | |
|---|---|---|
| 1 | B1: | S (a1,b) |
| 2 | | x = L(a2) |
| 3 | | z = ADD (x,w) |

In this example, the "S" instruction on line 1 stores the contents of register "b" into a memory location addressed by the contents of register "a1." Then, a load instruction on line 2 retrieves the value from the memory location addressed by the contents of register "a2" and places the value in register "x." Finally, the value in register "x" is used as an argument of the add instruction, on line 3. If the contents of registers "a1" and "a2" are identical, and the load instruction on line 2 is moved to a position prior to the "S" instruction on line 1, the register "x" will receive the prior value that was stored in the memory location addressed by register "a1," rather than the contents of register "b."

The modified code extract, shown below, properly handles the above-described potential aliasing problem involved in a data speculative move of the load instruction to a position prior to the store instruction:

| | | | | | |
|---|---|---|---|---|---|
| 1 | B1: | x = LDS (a2) | 1 | Recovery: | x = L(a2) |
| 2 | | z = ADD (x,w) | 2 | | z = ADD (x,w) |
| 3 | | S (a1, b) | 3 | | BR (Next) |
| 4 | | BRDV (Recovery,x) | | | |
| 5 | Next: | | | | |

In this case, the load instruction, relocated in the modified code extract to line 1, has been converted to an "LDS" instruction. As discussed above, the "LDS" instruction places a memory reference entry into the memory conflict table. The add instruction, on line 2 of the modified code extract, proceeds normally, followed by the store instruction on line 3. If the contents of "a2" and "a1" are identical, the store instruction on line 3 will invalidate the entry in the memory conflict table made by the "LDS" instruction. The "BRDV" instruction on line 4 will detect the invalidated reference in the memory conflict table for register "x" and cause control to flow to the recovery block in the second column of the above-modified code extract. In the recovery block, a non-speculated, non-eager-mode load instruction is executed to fetch the contents of the memory location addressed by the contents of register "a2," as previously modified by the store instruction on line 3 of the modified code extract. The add instruction is repeated in the recovery block and control is then returned to the instruction labeled by the label "Next" in the first column of the above modified code extract. Thus, the instruction "BRDV" detects the aliased store, in the case that register "a1" contains the identical value contained in register "a2," and branches to the recovery block where the load is repeated in order to retrieve the value stored into memory by the store instruction on line 3 in the first column of the above-modified code extract. If registers "a1" and "a2" do not contain the same value, then the "BRDV" instruction is essentially a no op. The four-line code extract, shown directly below, will be used to demonstrate the unified detection of, and recovery from, both control speculative and data speculative relocation of a single load instruction:

```
1    B1:    p = CMPP (condition)
2           S (a2,u) if p
3           x = L(a1) if p
4           z = ADD (x,w) if p
```

Execution of the load instruction on line 3 of the above code extract is both guarded by the CMPP instruction on line 1 as well as potentially aliased by the store instruction on line 2. Thus, if the load instruction on line 3 is moved to a position preceding the CMPP instruction, on line 1, the load instruction may result in a spurious exception, as described above for the pure control speculation example, or may result in the loading of an incorrect value from memory, rather than the value contained in the register "u" that is placed in memory by the store instruction on line 2, as in the pure data speculation example, above.

The technique for detecting and correcting any errors that occur because of a both control and data speculative move of the load instruction on line 3 is shown in the modified code extract below:

```
1    B1:    x = LDS.E (a1)          1    Recovery:   x = L(a1)
2           z = ADD.E (x,w)         2                z = ADD (x,w)
3           p = CMPP (condition)    3                BR (Next)
4           S (a2, v) if p
5           BRDV (Recovery,x) if p
6    Next:
```

In this case, the load and add instructions, originally appearing in the original code extract on lines 3 and 4, have been converted to "LDS.E" and "ADD.E" instructions, respectively, occurring on lines 1 and 2 of the modified code extract. As in the pure control speculation example, above, the "LDS.E" instruction defers any exceptions that are generated in retrieving the value from the memory address contained in register "a1" until after the subsequent CMPP instruction is executed. If the CMPP instruction sets register "p" to FALSE, the generation of the exception will be ignored in the remaining code. If the CMPP instruction sets register "p" to TRUE, then the load will be repeated in the recovery block and will presumably generate and immediately signal the same exception. If the contents of register "a1" is identical to the contents of register "a2," then the store instruction on line 4 of the modified code extract is an aliasing store, and the load instruction on line 1 of the modified code extract will retrieve an incorrect value from memory and store the incorrect value into register "x." However, this aliasing store will be detected by instruction "BRDV" on line 5, resulting in execution of the recovery block and a repeat of the load instruction to retrieve from memory the value stored into memory by the store instruction on line 4. If the instruction "CMPP" on line 3 sets register "p" to FALSE, neither the aliasing store nor the speculated load instruction are executed in the original code extract and, in the modified code extract, the aliasing store is not executed and any potential exception generated by the load instruction is ignored. Finally, the modified code extract shown above will correctly handle the case when load instruction on line 1 generates an exception and the store instruction on line 4 is an aliasing store. The correct recovery from either or both control and data speculation resulting from relocation of a single load instruction, as in the above example, is made possible by the fact that the instruction "BRDV" detects both an invalid entry in the memory conflict log associated with register "x" as well as the speculative tag associated with register "x" having been set to TRUE.

Special Considerations for Control and Data Speculation under the Unified Framework for Control and Data Speculation with Recovery Code A number of different types of complications arise from control and data speculation. Many of these complications concern instructions subsequent to a speculated instruction that depend on values defined by the speculated instruction. The following examples illustrate these different complications as well as the techniques of the present invention that are used to overcome them.

Web Interferences

Figure 12A:
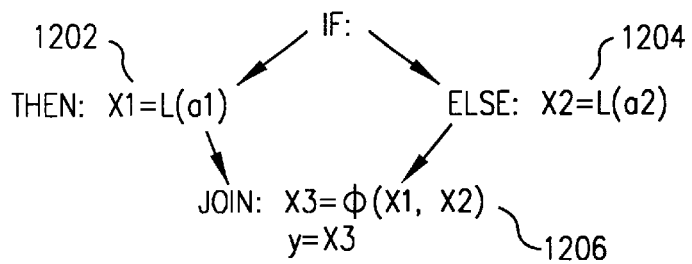
FIGS. 12A–C illustrate the problem of multiple speculations from within certain control structures of an assembly-language program in single static assignment form.

Control and data speculation is frequently carried out on intermediate-level code that is later, in the final stages of compilation, transformed into a final set of assembly-language or machine-code instructions. This intermediate-level code is frequently transformed into a static single assignment ("SSA") representation in which virtual registers are statically defined exactly once. Virtual registers are later mapped to actual machine registers, and certain SSA-form abstractions, called φ-functions, are resolved and eliminated, replaced in certain cases by one or more machine-code instructions. FIG. 12 illustrates the problem of multiple speculations from within certain control structures of an assembly-language program in SSA form. In FIG. 12A, a small code extract, contains an if-then-else construct containing two load instructions, 1202 and 1204, respectively, in separate basic blocks. In SSA form, multiple definitions of a particular virtual register, in the case of the example in FIG. 12, register "x," give rise to multiple numbered virtual registers representing the single virtual register. For example, in the code extract of FIG. 12A, the load instruction that defines the value in register "x" 1202 gives rise to virtual register "x1." The load instruction in the else branch of the if-then-else control structure 1204 gives rise to a second numbered virtual register "x2." Both "x1" and "x2" represent the same virtual register "x." At the point where the if-then and else branches coalesce into a single execution stream 1206, a φ-function is introduced along with still another numbered virtual register. The statement labeled with the label "JOIN" 1206 indicates that numbered virtual register "x3" is assigned either the value stored in x1 or x2, depending on which of x1 or x2 is set in the preceding if-hen-else construct. Thus, if the condition tested in the if statement evaluates to TRUE, then numbered virtual register "x1" is defined by the load instruction labeled with the label "THEN" 1202 and the φ-function 1206 provides the value retrieved by this load instruction 1202 for assignment to numbered virtual register "x3." The numbered virtual registers and φ-functions are simply a notational device that simplifies certain types of optimizations.

Figure 12B:
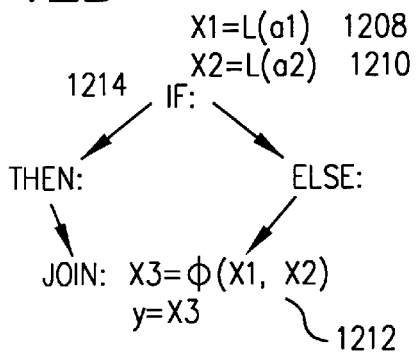

FIG. 12B illustrates speculation of the load statements from the then and else blocks of the if-then-else construct in FIG. 12A to positions 1208 and 1210 preceding the if block. Unfortunately, control speculation of both load instructions results in a situation in which the subsequent φ-function 1212 cannot be properly disambiguated when the SSA form of the program is transformed into actual machine-code instructions. In this case, because both numbered virtual register "x1" and numbered virtual register "x2" are assigned values prior to the if block 1214, both "x1" and "x2" have validly assigned values, or, in other words, are both live at the point where the φ-function 1212 is located.

Because the φ-function must select one of the two numbered registers, the φ-function may incorrectly select a register for one of the two possible branches of the if-then-else construct.

Figure 12C:
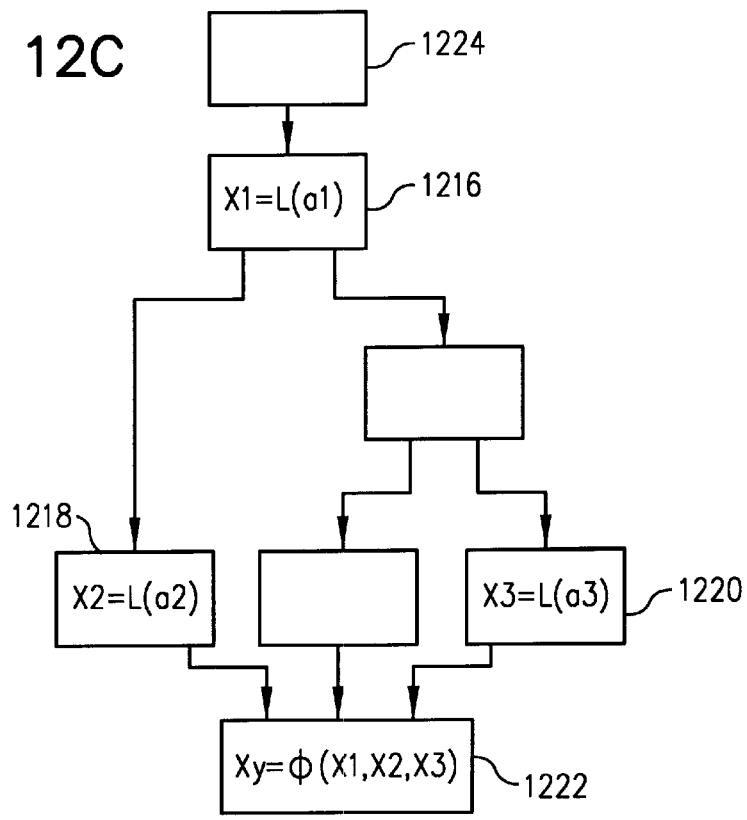

Although insertion of additional copy instructions may break such an interference, this approach is not used in the present invention because it complicates scheduling heuristics and because it may result in inefficiencies. Instead, the present invention classifies a set of non-φ definitions connected through one or multiple φ-functions as a web and avoids interference between all definitions within a web during speculation. Thus, if the basic block of a first definition of a virtual register can be reached from a basic block containing a second definition of the same virtual register in the same web, where, in SSA form, the different definitions of the same register give rise to different numbered registers, the first definition cannot be speculated to any basic block from which the second basic block can be reached in the flow control diagram. This restriction is illustrated in FIG. 12C. FIG. 12C is a small extract from a flow control diagram containing basic blocks in which register "x" is defined by three different load instructions 1216, 1218, and 1220, respectively, in three different basic blocks. These different definitions of virtual register "x" give rise to the numbered virtual registers "x1," "x2," and "x3." A web results from the φ-function included in a basic block 1222 where the various control paths leading from the basic blocks in which register "x" is defined converge. The above described restriction means that neither the load instruction that defines numbered virtual register "x2" nor the load instruction that defines numbered virtual register "x3" can be speculated from the basic blocks in which they are included, 1218 and 1220, respectively, to basic block 1216 or to any basic block that precedes 1216, such as basic block 1224. Because basic block 1216 cannot be reached from either of basic blocks 1218 and 1220, the load instruction that defines numbered virtual register "x1" can, on the other hand, be speculated to a basic block that precedes basic block 1216 in the flow control diagram.

Overwriting of Registers by Dependent Instructions on a Speculative Chain

Often, more than a single unsafe speculated instruction is moved across a guarding predicative branch. All the instructions subsequent to a speculated instruction that depend on the speculated instruction and that precede the BRDV instruction inserted for possible recovery of errors resulting from the speculated instruction are called a speculative chain. The following code extract illustrates the care which must be taken when including instructions dependent on a speculated instruction in a speculative chain:

| 1 | B1: | p = CMPP (condition) |
|---|-----|----------------------|
| 2 |     | x = L(y) if p        |
| 3 |     | z = ADD (x,w) if p   |
| 4 |     | y = ADD (y,z) if p   |

In the above original code extract, a load instruction that defines register "x" occurs on line 2, followed by two add instructions: first add instruction that defines the value of register "z," on line 3, and that uses the value of register "x" defined in the preceding line, and a second add instruction, on line 4, that overwrites the register "y" that previously stored the memory address from which the value in register "x" is retrieved by the load operation on line 2. An incorrect control speculation of the load instruction on line 2, above, is shown below:

| 1 | B1:   | x = L.E (y)          | 1 | Recovery: | x = L(y)      |
|---|-------|----------------------|---|-----------|---------------|
| 2 |       | z = ADD.E (x,w)      | 2 |           | z = ADD (x,w) |
| 3 |       | y = ADD.E (y,z)      | 3 |           | y = ADD (y,z) |
| 4 |       | p = CMPP (condition) | 4 |           | BR (Next)     |
| 5 |       | BRDV (Recovery,x) if p |  |         |               |
| 6 | Next: |                      |   |           |               |

In this modified code extract, the load instruction and the two add instructions that previously occurred on lines 2–4 have now been moved to lines 1–3, preceding the CMPP instruction that originally guarded the load instruction. Consider the case where the CMPP instruction on line 4 of the modified code extract sets register "p" to TRUE. In this case, all three of the load and two add instructions that follow the CMPP instruction in the original code extract, above, would be executed in the original code extract. If the load instruction on line 1 of the modified code extract generates an exception, the exception is deferred, since the simple non-eager mode load instruction of the original code extract has been replaced by an eager-mode load instruction in the modified code extract. Then, both add instructions on line 2 and 3 of the modified code extract are executed. The add instructions propagate the exception to registers "z" and "y" via the speculative tags associated with registers "z" and "y." The second add instruction overwrites register "y," used to define the address from which the load retrieves the value placed in register "x" on line 1. As stated above, the CMPP instruction returns TRUE and the following BRDV instruction detects the speculative tag having been set to TRUE for register "x" as a result of the generated exception and transfers control to the recovery lock. In the first instruction on the recovery block, a non-eager-mode version of the load instruction is re-executed. However, because register "y" was overwritten on line 3, this load instruction most likely results in the retrieval of a value from a different memory location than that from which the value for "x" was originally retrieved by the eager-mode load instruction on line 1. Thus, in the incorrectly modified code extract above, register "y" used in the recovery block on line 1, was incorrectly included within the speculative chain of instructions that depend on the speculated load instruction of line 1 and that precede the matching BRDV instruction on line 5 without guaranteeing that the value contained in register "y" will be the same at the beginning of the recovery block as prior to execution of the speculated load instruction.

In the following, correctly modified code extract, this problem is overcome by insuring that the second add instruction is not included on the speculative chain arising from the speculated load instruction on line 1:

| 1 | B1: | x = L.E (y)          | 1 | Recovery: | x = L(y)      |
|---|-----|----------------------|---|-----------|---------------|
| 2 |     | z = ADD.E (x,w)      | 2 |           | z = ADD (x,w) |
| 3 |     | p = CMPP (condition) | 3 |           | BR (Next)     |
| 4 |     | BRDV (Recovery,x) if p |  |         |               |
| 5 |     | y = ADD (y,z) if p   |   |           |               |

Thus, in this correctly modified code extract, the value in register "y" is not overwritten prior to execution of the BRDV instruction that matches this speculated load instruction.

Proper Transformation of Speculative Chain Instructions to Eager Mode

Note that, in general, those instructions included in the speculated chain following a speculated load instruction are generally converted to equivalent eager-mode instructions. This allows for proper deferral of any exception generated by the load instruction until after execution of the matching BRDV instruction. The reason for converting the dependent speculative chain instructions to equivalent eager-mode instructions is illustrated in the following example:

| 1 | | x = L.E (y) | 1 | Recovery | x = L(y) |
|---|---|---|---|---|---|
| 2 | | p = CMPP (condition) | 2 | | BR (Next) |
| 3 | | BRDV (Recovery,x) if p | | | |
| 4 | Next: | z = L (x) if p | | | |

In the above original code extract, the second load instruction, on line 4, has not been included on the speculative chain of the speculated load instruction on line 1. Thus, recovery from any errors introduced by the speculation of the first load instruction will have been accomplished before the second load instruction is executed. In the incorrectly modified code extract below, the second load instruction is moved to a position preceding the BRDV instruction and is thus now part of the speculative chain arising from the first speculated load instruction on line 1:

| 1 | | x = L.E (y) | 1 | Recovery: | x = L(y) |
|---|---|---|---|---|---|
| 2 | | p = CMPP (condition) | 2 | | z = L(x) |
| 3 | | z = L (x) if p | 3 | | BR (Next) |
| 4 | | BRDV (Recovery,x) if p | | | |
| 5 | Next: | | | | |

The second load instruction is included on the speculative chain arising from the first load instruction because the second load instruction depends on the first load instruction. The value in register "x" is defined by the first load instruction, and, in the incorrectly modified code extract, is used as the memory address for the second load instruction. Consider the case where the CMPP instruction on line 2 of the incorrectly modified code extract returns the value TRUE following generation of a non-terminating exception, such as a page fault, by the speculated load instruction on line 1. In this case, the speculative tag for register "x" is set to TRUE by the first load instruction. However, the second load instruction on line 3 of the incorrectly modified code extract executes prior to the BRDV instruction. Because this second load instruction has not been converted to an eager-mode load instruction, the second load instruction will immediately signal the non-terminating exception generated in the first load instruction after detecting that the speculative tag associated with register "x" is set to TRUE. At this point, however, the non-terminating nature of the exception may not be properly handled, since the address stored in register "x" is likely not located on the same page as the address stored in register "y." Depending on the machine architecture, it may not even be possible to distinguish the non-terminating nature of the exception at the point that the exception is signaled by the second load instruction on line 3, and the program will prematurely terminate rather than handle the non-terminating page fault. This problem is easily remedied, in the correctly modified code extract below, by simply converting the second load instruction to an eager-mode load instruction, thus deferring signaling of the exception that is potentially generated by the first load instruction until after execution of the BRDV instruction on line 4:

| 1 | | x = L.E (y) | 1 | Recovery: | x = L(y) |
|---|---|---|---|---|---|
| 2 | | p = CMPP (condition) | 2 | | z = L(x) |
| 3 | | z = L.E (x) if p | 3 | | BR (Next) |
| 4 | | BRDV (Recovery,x) if p | | | |
| 5 | Next: | | | | |

Since the BRDV instruction will not be executed if the register "p" contains a FALSE value, an exception generated by the first load instruction and propagated by the second load instruction will be correctly ignored in the case that neither instruction would have executed in the original, non-speculative version of the code extract.

Proper Inclusion of Instructions into the Speculative Chain Dependent of a Data Speculated Instruction The following code extract includes a store instruction, on line 1, followed by load, CMPP, and add instructions on line 2–4:

| 1 | B1: | S (a1,v) |
|---|---|---|
| 2 | | x = L (a2) |
| 3 | | p = CMPP (x<y) |
| 4 | | z = ADD (b,c) if p |

Suppose that the load instruction is speculated, along with the CMPP and add instructions, to positions preceding the store instruction as shown in the following incorrectly speculated code extract:

| 1 | B1: | x = LDS (a2) | 1 | Recovery: | x = L(a2) |
|---|---|---|---|---|---|
| 2 | | p = CMPP (x<y) | 2 | | p = CMPP (x<y) |
| 3 | | z = ADD (b,c) if p | 3 | | z = ADD (b,c) if p |
| 4 | | S (a1,u) | 4 | | BR (Next) |
| 5 | | BRDV (Recovery,x) | | | |
| 6 | Next: | | | | |

Consider the case where the speculated load instruction on line 1 of the incorrectly modified code extract loads a value from a memory location that is subsequently aliased by the store instruction on line 4 because registers "a1" and "a2" contain identical values. The speculated load instruction on line 1 defines register "x" to a probably incorrect value, since the value stored in register "x" as a result of the load instruction is retrieved from a memory location to which a different value will be stored by the store instruction on line 4, originally preceding the loan instruction in the original code extract. Next, the CMPP instruction on line 2 is executed with an incorrect value in register "x." Assume that the compare condition, "x<y," returns the value TRUE based on the incorrect value stored in register "x," whereas, if the correct value, contained in register "u," had been stored in register "x," the CMPP instruction would have returned the value FALSE. In this case the predicated add instruction on line 3 is executed and z is defined by the predicated add instruction. After execution of the store instruction on line 4, the BRDV instruction on line 5 detects the invalidated memory conflict table entry associated with register "x" and transfers control to the recovery block. In the recovery block, the load instruction is repeated to retrieve the correct value stored by the store instruction on line 4 of the incorrectly modified code extract, and the CMPP instruction on line 2 of the recovery block now returns the correct Boolean value FALSE. However, the predicated add instruction that was copied to the recovery block, on line 3 of the recovery block, becomes a no op since register "p" contains the value FALSE. Finally, the unconditional branch instruction on line 4 of the recovery block returns control to the line labeled "Next" on line 6 of the incorrectly modified code extract. The result is that, although the data speculated load was repeated in the recovery block, and x was defined in the recovery block to the correct value, the add instruction was not re-executed in the recovery block, and register "z" therefore continues to contain an incorrect value. In this case, recovery was incomplete.

The correctly speculated code extract is shown below:

```
1  B1:   x = LDS (a2)      1  Recovery:  x = L(a2)
2        p = CMPP (x<y)    2             p = CMPP (x<y)
3        S (a1,u)          3             BR (Next)
4        BRDV (Recovery,x)
5  Next: z = ADD (b,c) if p
```

In the correctly speculated code extract, the add instruction has not been included on the speculative chain arising from the data speculated load instruction. Thus, the potential aliasing of the data speculated load instruction is detected and recovered prior to definition of register "z."

Proper Conversion of Speculative Chain Instructions Dependent on a Data Speculative Load to Equivalent Eager-Mode Instructions The following code extract illustrates the necessity for properly converting non-eager-mode instructions on the speculative chain of a data speculated load to eager-mode instructions. First is a simple three-line code extract prior to data speculation:

```
1  B1:  S (a1,u)
2       x = L (a2)
3       y = L (x)
```

In the following incorrectly modified code extract, the first load instruction, originally on line 2 of the original code extract, above, is speculated ahead of the potentially aliasing store instruction, originally on line 1 of the original code extract, above:

```
1  B1:  x = LDS (a2)
2       s = (a1, u)
3       y = L (x)
4       BRDV (Recovery,x)
```

In the above incorrectly modified code extract, the second load instruction on line 3 that retrieves a value from the memory address contained in register "x," itself retrieved from the memory address contained in register "a2" by the first load instruction on line 1, is now on the speculative chain of the first load instruction. If the store instruction on line 2 is an aliasing store, the first load instruction will most likely load an incorrect value into register "x." Consider the case where the first load instruction loads the value of zero into x, after which the aliasing instruction stores a valid address into the memory location addressed by the value in both registers "a2" and "a1." The second load instruction will now attempt to retrieve an integer from the memory location addressed by zero. This attempt will result in an exception, and because the second load instruction is not an eager-mode load instruction, the exception will be immediately signaled, probably leading to termination of the program. However, in the original code extract, above, the store instruction is executed prior to either load instruction, and no aliasing occurs.

The correct speculation of the two load instructions in the above original code extract is given as follows:

```
1  B1:  x = LDS (a2)
2       s = (a1, u)
3       y = L.E (x)
4       BRDV (Recovery,x)
```

The correctly speculated code extracts differ from the incorrectly modified code extract in that the second load instruction has been converted to an equivalent eager-mode variation of the load instruction, causing any exception generated by the second load instruction to be deferred until the following BRDV instruction has a chance to transfer control to a recovery block.

Placing All Necessary Instructions on the Speculative Chain Dependent on a Data Speculated instruction A final consideration related to data speculation is presented in the following code extract:

///
///
///
///

```
1        x = LDS.E (a)        1  Recovery:  x = L(a)
2        y1 = x+u             2             y1 = x+u
3        z = y1               3             z = y1
4        y2 = v+10 if p       4             BR (Next)
5        BRDV (Recovery,x)
6  Next: y3 = φ (y1,y2)
7        w = y3
```

In this example, a speculative load instruction is followed by two dependent instructions on lines 2 and 3. A third instruction follows on line 4 that does not appear to depend on the load instruction on line 1, followed by a BRDV instruction on line 5 that matches with the speculated load instruction on line 1. Finally an assignment to a numbered variable through an SSA-form φ-function follows on line 6. In this example, a direct, but naïve, analysis of the instructions subsequent to the speculated load instruction on line 1 and prior to the BRDV instruction on line 5 may result in a determination that only the first two instructions, on lines 2 and 3, depend from the load instruction on line 1. The instruction on line 2 adds the value contained in register "x," loaded by the load instruction on line 1, to the contents of another register and places the sum into numbered virtual register "y1." The next instruction copies the value in numbered virtual register "y1" to register "z." The instruction on line 4 assigns a value that does not depend directly or indirectly on the value in register "x" into numbered virtual register "y2." Thus, the naïve dependence analysis does not find the instruction on line 4 to depend from the load instruction on line 1, and, as a result, the instruction on line 4 is not included in the speculative chain of instructions that depend from the speculated load instruction on line 1 and is not copied to the recovery block.

This naïve dependency analysis, however, ignores the dependency arising through the φ-function on line 6. In this example, the φ-function should return the value in register "y1" when predicate register "p" is FALSE, and should return the value in register "y2" when the value in predicate register "p" is TRUE. If the recovery block is executed, however, the φ-function on line 6 will return the value in register "y1," regardless of the value in the predicate register "p." This problem can be averted by correctly detecting the dependence of the instruction on line 4 on the data speculated load instruction on line 1 via an output dependency between y1 on line 2 and y2 on line 4. In the following modification, that dependence has been correctly analyzed, the instruction on line 4 has been included in the speculative chain of instructions depending on the speculated load instruction on line 1, and the instruction on line 4 has, therefore, been copied to the recovery block.

| 1 | x = LDS.E (a) | 1 | Recovery: | x = L(a) |
|---|---|---|---|---|
| 2 | y1 = x+u | 2 | | y1 = x+u |
| 3 | z = y1 | 3 | | z = y1 |
| 4 | y2 = v+10 if p | 4 | | y2 = u+10 if p |
| 5 | BRDV (Recovery,x) | 5 | | BR (Next) |
| 6 | Next: y3 = φ (y1,y2) | | | |
| 7 | w = y3 | | | |

Cascaded Speculation

The recovery of speculated instructions that depend on other speculated instructions requires careful analysis. The four different possibilities arising from the dependence of one speculated instruction on another speculated instruction are summarized below: (1) a purely control speculated instruction depending on another purely control speculated instruction, abbreviated "C→C"; (2) a data speculated or both control and data speculated instruction depending on a purely control speculated instruction, abbreviated "C→D or CD"; (3) a purely control speculated instruction depending on a data speculated or combined control and data speculated instruction, abbreviated "D or CD→C"; and (4) a data speculated instruction or combined control and data speculated instruction depending on another data speculated instruction or combined control and data speculated instruction, abbreviated "D or CD→D or CD."
C→C There are two cases to consider when one purely control speculated instruction depends on a second purely control speculated instruction. In the first case, both control speculated instructions share a matching BRDV instruction, or in other words, the second control speculated instruction is on the speculative chain of the first control instruction. The following code extract shows that, in the recovery block, the first of the two control speculated load instructions is converted to an equivalent non-eager mode instruction, while the second, dependent control speculated instruction remains in eager mode in the recovery block. The second load instruction was originally converted to eager mode because the second load instruction depends from the first speculated load instruction. The second load instruction is not truly control speculated in and of itself.

| x = L.E (a) | | Recovery: | x = L(a) |
|---|---|---|---|
| • | | | • |
| • | | | • |
| • | | | • |
| y = L.E (x) | | | y = L.E (x) |
| BRDV (Recovery,x) if p | | | BR (Next) |
| Next: | | | |

In the second case where one control speculated instruction depends from another control speculated instruction, both control speculated instructions are matched with corresponding BRDV instructions. In this case, there will be a recovery block corresponding to each speculated instruction in which each speculated instruction will appear in non-eager mode. In this case, the second speculated load instruction is not on the speculative chain of the first speculated load instruction.

| x = L.E (a) | | Recovery: | x = L(a) |
|---|---|---|---|
| • | | | BR (Next 1) |
| • | | | |
| • | | | |
| y = L.E (x) | | Recovery 2: | y = L (x) |
| BRDV (Recovery1,x) if p | | | BR (Next 2) |
| Next1: | BRDV (Recovery2,y) if p | | |
| Next2: | | | |

C→C or CD

When a data speculated or combined control and data speculated instruction depends from a purely control speculated instruction, as in the example shown below, both instructions will always have matching BRDV instructions, and thus the speculated chain of the first purely control speculated instruction does not include the second data or combined control and data speculated instruction.

| x = L.E (a) | | Recovery: | x = L(a) |
|---|---|---|---|
| • | | | BR (Next 1) |
| • | | | |
| • | | | |
| y = LDS.E (x) | | Recovery 2: | y = L (x) |
| • | | | BR (Next 2) |
| • | | | |
| BRDV (Recovery1,x) if p | | | |
| Next1: | BRDV (Recovery2,y) if p | | |
| Next2: | | | |

D or CD→C

A purely control speculated instruction that depends from a data or combined data and control speculated instruction should always be included in the speculative chain of the first data or control data speculated instruction, since the second, purely control speculated instruction may use an incorrect value resulting from an aliasing store with respect to the first data or combined control and data speculated instruction. The second purely control speculated instruction should be copied, in eager mode, to the recovery block that corresponds to the first data or combined control and data speculated instruction and should be copied to the recovery block corresponding to the second, purely control speculated instruction in non-eager mode, as shown below.

| x = LDS.E (a) | | Recovery 1: | x = L(a) |
|---|---|---|---|
| • | | | • |
| • | | | • |
| • | | | • |
| y = L.E (x) | | | y = L.E (x) |
| • | | | BR (Next 1) |
| • | | | |
| BRDV (Recovery1,x) if p | | Recovery 2: | y = L(x) |
| Next1: | BRDV (Recovery2,y) if p | | BR (Next 2) |
| Next2: | | | |

D or CD→D or CD

In the case where a data or combined control and data speculated instruction depends on another data or combined control and data speculated instruction, as shown below, the second data or combined control and data speculated instruction, but none of the successors of the second speculated instruction, belongs to the speculative chain of the first data or combined control and data speculated instruction. In the recovery block corresponding to the first data or combined control and data speculated instruction, the second data or combined control and data speculated instruction is converted to an instruction that invalidates memory conflict table entries associated with the source register so that, in the second recovery block corresponding to the second data or combined control and data speculated instruction, that second data or combined control and data speculated instruction will be recovered independently by a non-eager mode copy of the second data or combined control and data speculated instruction in the second recovery block.

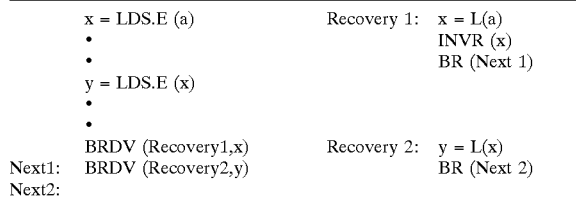

Implementation of an Embodiment of the Present Invention

Figure 13:
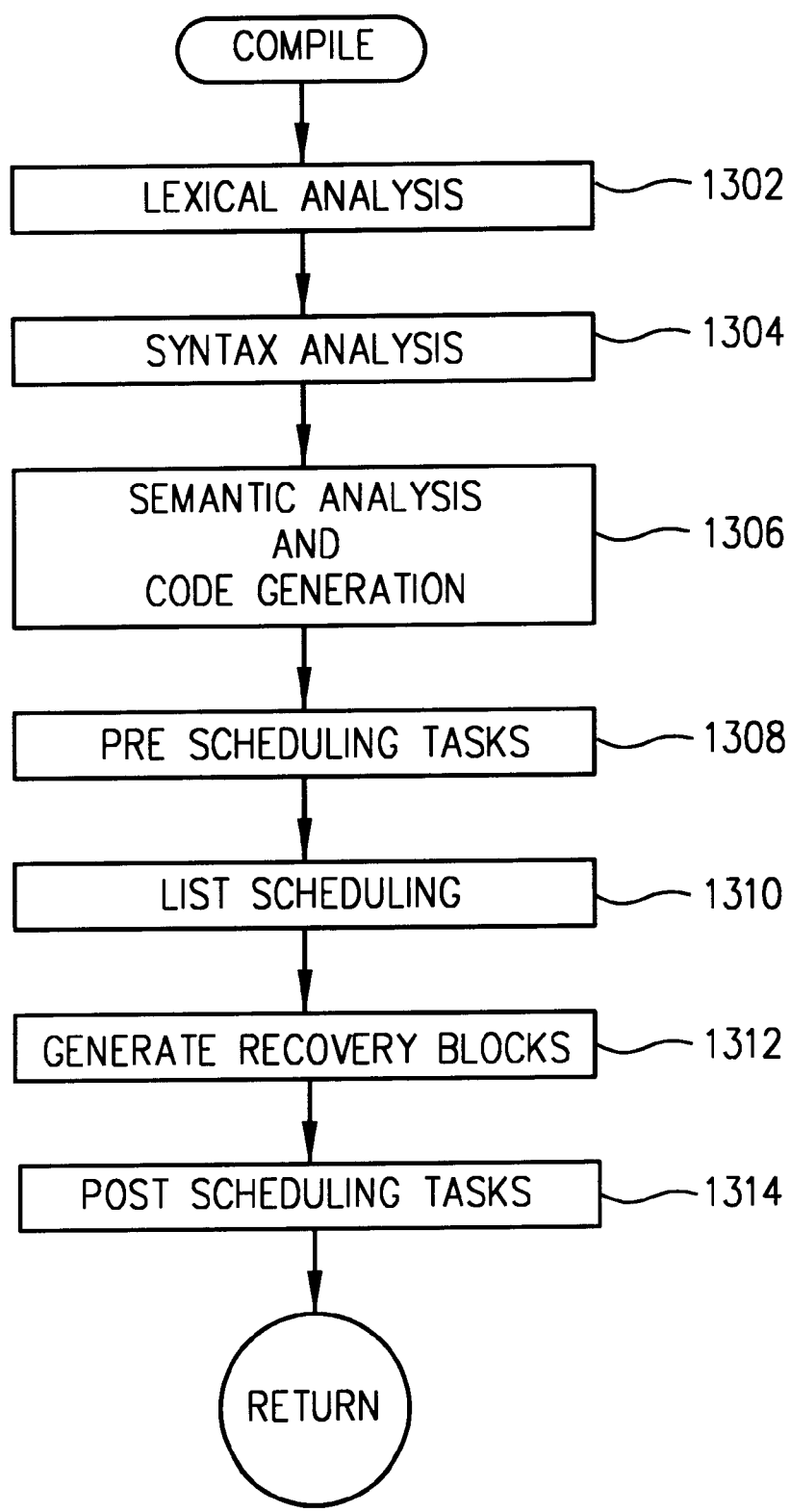
FIG. 13 shows a flow control diagram overview of the compilation process.

FIG. 13 shows a flow control diagram overview of the compilation process. Compilers generally compile a source-language program into assembly-language and machine-code instructions in a number of distinct phases, each of which may require one or more passes through the source-language program or intermediate code generated from the source-language program. Compilers differ in the number of passes and phases that they employ. The flow control diagram shown in FIG. 13 is meant to generally describe the fundamental steps of compilation, each of which may occur within different numbers and types of phases in different compilers.

Generally, a compiler first conducts lexical analysis on the source-language program, shown in step 1302. Lexical analysis concerns the identification and characterization of various tokens, such as key words, literal numbers, operators, variable names, and formatting tokens that are included in the source-language program. Then, in step 1304, compilers generally conduct a syntax analysis on the tokenized output from lexical analysis, in which higher-level grammatical phrases and language constructs are identified. For example, various control expressions such as while loops and if-then-else statements, are recognized during syntax analysis. Next, in step 1306, the compiler conducts semantic analysis and generates intermediate-level code. Syntax analysis, semantic analysis, and code generation may be combined in a single phase, or semantic analysis and code generation may be combined together in a distinct phase. Semantic analysis is concerned with the meaning of the constructs identified in syntax analysis and in proper handling of interdependencies between identified language constructs, such as type checking.

Once intermediate level code has been generated, in step 1306, the compiler generally embarks on various code optimization steps in order to produce compact and efficient code. A common type of code optimization for code intended to run on processors that can concurrently execute more than one instruction is list scheduling. First, certain optimization techniques may be employed prior to list scheduling, in step 1308, along with preparatory steps that produce code representations used during list scheduling. Then, list scheduling is conducted in step 1310. In order to carry out unified control and data speculation, an embodiment of the present invention introduces a number of changes to the list scheduling step 1310. An embodiment of the present invention then introduces a new step 1312, following list scheduling, in which the above-discussed recovery blocks are generated. Finally, a compiler may carry out additional optimization tasks following completion of list scheduling and the generation of recovery blocks in step 1314. Such tasks may include, for example, a post scheduling transformation of SSA form intermediate code into executable machine instructions.

Figure 14:
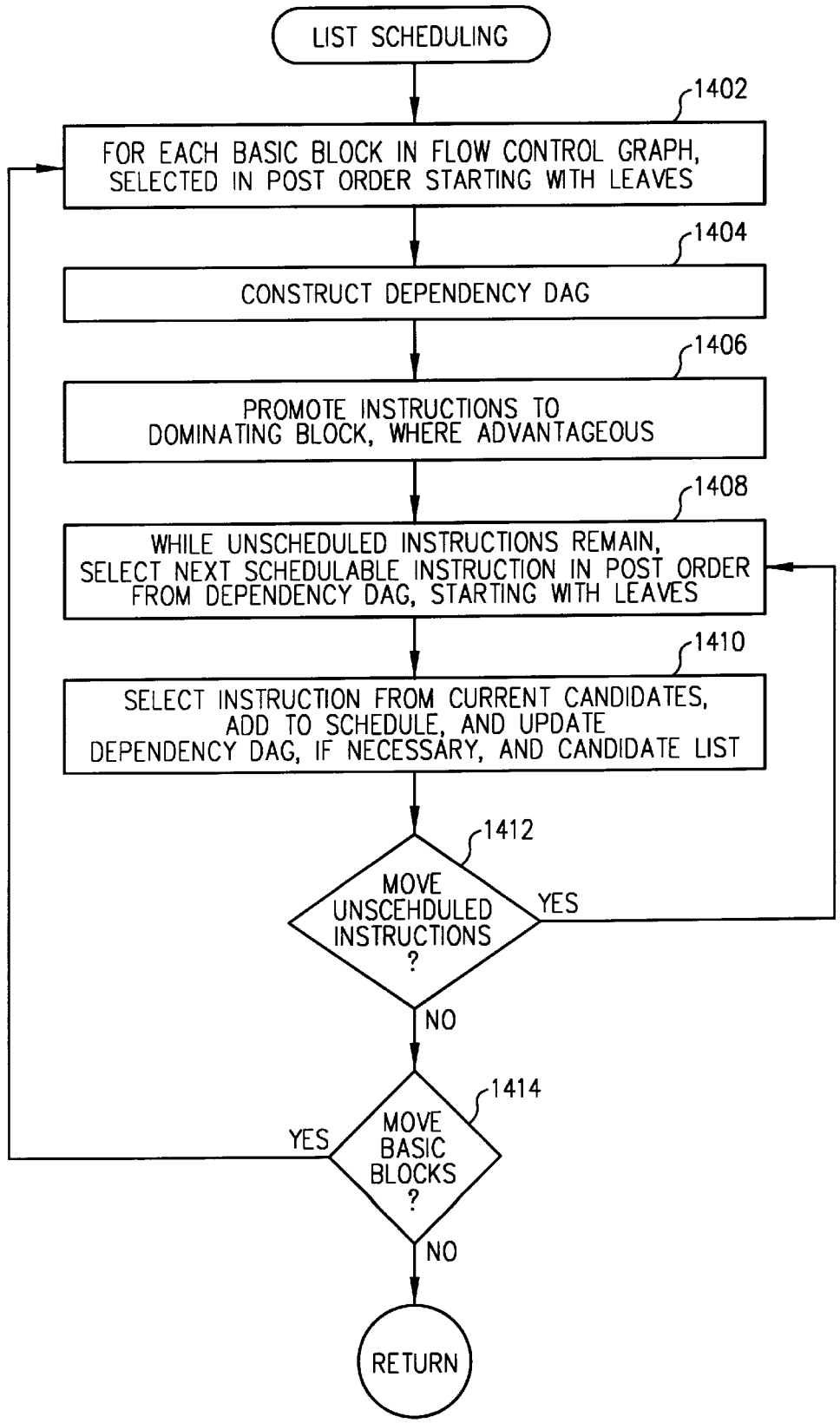
FIG. 14 shows a high-level flow control diagram of list scheduling.

FIG. 14 shows a high-level flow control diagram for the list scheduling optimization technique. List scheduling depends on the previous generation of control flow graphs, described above in the first section of the Detailed Description of the Invention. It should be noted that the list scheduling process, as shown in the flow control diagram of FIG. 14, may be conducted for an entire intermediate-code program or may be iteratively conducted on portions of an intermediate-code program, such as on discrete routines included in the program. List scheduling considers each basic block in a control flow graph in some topological order, commonly in post order, starting with the leaf nodes in the control flow graph, as indicated in step 1402. For each basic block, list scheduling constructs a dependence DAG, as discussed above in the first section of the Detailed Description of the Invention. After analyzing the dependence DAG, list scheduling, in step 1406, may promote certain instructions within the selected basic block to a basic block that dominates the selected basic block. Then, list scheduling traverses the remaining instructions in the dependence DAG in order to schedule the instructions of the basic block for execution. The resulting schedule is a sequential list of groups of instructions, in execution order, such as the optimized versions of the routine "incEnds" shown in FIGS. 8 and 9. The dependence DAGs used in this process include machine cycle times, associated with edges within the graph, required for execution of instructions from which the edges originate. List scheduling traverses the dependence DAG in a topological order, commonly post order, starting with the leaf nodes of the dependence DAG. The instructions in the traversed leaf nodes become candidate instructions, from which list scheduling selects instructions for scheduling. List scheduling employs heuristics to select instructions such that the resulting schedule requires close to a minimal number of machine cycles for execution. In step 1410, after the next instruction or group of instructions has been selected from the current candidates and added to the schedule, the list scheduling updates the dependence DAG and deletes the scheduled instruction or group of instructions from the candidate list. If more instructions remain in the dependence DAG that have not yet been scheduled, as detected in step 1412, control flows back to step 1408, where the traversal of the dependence DAG is continued. Once all the instructions in the basic block have been scheduled, list scheduling detects, in step 1414, if there are more basic blocks in the control flow graph and, if so, control flows back to step 1402 for consideration of the next basic block in the traversal of the control flow graph.

In a preferred embodiment of the present invention, steps 1404, 1408, and 1410 of FIG. 14 are modified. First, in constructing the dependence DAG, data and control speculative dependencies are identified by the preferred embodiment of the present invention and control and data speculative edges are included in the dependence DAG. In step 1408, instructions are selected for which all dependencies have been satisfied by previous scheduling of the instructions from which dependence relations arise. Step 1408 is modified by the preferred embodiment of the present invention so that an instruction with only unsatisfied speculative dependencies can be considered a candidate for scheduling. Instructions with no unsatisfied dependencies are preferred to instructions with only unsatisfied speculative dependencies, but both are included in the candidate list for selection. It should be noted that additional heuristics need to be employed to determine that the probability of aliasing is reasonably small prior to scheduling data speculated instructions, because frequent execution of recovery blocks may significantly slow execution of a program. Finally, in step 1410, after selection of an instruction with speculative dependencies, the preferred embodiment of the present invention updates the dependence DAG by inserting a BRDV instruction in place of the instruction that has been speculatively scheduled, with additional dependent edges created in the dependence DAG between the inserted BRDV instruction and other instructions remaining in the dependence DAG.

The addition of speculative dependence edges to dependence DAGs has been discussed above. The modifications of step 1408 of the preferred embodiment of the present invention are straightforward: scheduled instructions with only speculative dependence may be scheduled for execution in addition to instructions with no remaining dependence relations. The implementation of that portion of the present invention related to converting instructions to eager mode and updating the dependence DAGs following scheduling of a speculated instruction, in step 1410 of FIG. 14, and the separate step (1312 in FIG. 13) of generating recovery blocks are described below, in detail, in a high-level pseudo-code implementation.

The following routine, "ScheduleSpecLoadInst," is called by list scheduling when list scheduling selects an instruction having unsatisfied control or data speculation relationships from the candidate list for scheduling.

The current dependence DAG and the instruction selected for scheduling are supplied to the routine "ScheduleSpecLoadInst" as arguments "Dag" and "LoadInst," respectively, on line 1.

If the instruction "LoadInst" is data speculated by virtue of being scheduled, as detected by ScheduleSpecLoadInst on line 3, ScheduleSpecLoadInst converts instruction "LoadInst" to an "LDS" instruction. If instruction "LoadInst" has become control speculated by virtue of being scheduled, then ScheduleSpecLoadInst converts instruction "LoadInst" to an equivalent eager-mode instruction on line 4. ScheduleSpecLoadInst inserts a BRDV instruction, "BrdvInst," into the dependence DAG on line 5. Next, on line 8, ScheduleSpecLoadInst calls the routine "BuildInEdgesToBRDV" to add edges into the dependence DAG from the instruction "LoadInst" to the inserted instruction "BrdvInst" as well as from any unsatisfied speculative predecessors of the inserted instruction "BrdvInst," so that the instruction "BrdvInst" will be scheduled after the instruction "LoadInst" and the unsatisfied speculative predecessors of the instruction "BrdvInst." Finally, on line 9, SchedulSpecLoadInst calls the routine "BuildOutEdgesFromBRDV" to add to the dependency graph edges from the inserted "BrdvInst" instruction to certain successors of "LoadInst." This is done to insure that the speculative chain of instructions depending on "LoadInst" will be recoverable.

The routine "BuildInEdgesToBRDV" takes the dependence DAG, a speculated instruction, and the BRDV instruction inserted to verify execution of the speculated instruction, as arguments "Dag," "LoadInst," and "BrdvInst," respectively.

```
1      ScheduleSpectLoadInst(Dag, LoadInst)
2      {
3         if (data speculative) convert LoadInst to a LDS;
4         if (control speculative) add .E to LoadInst to convert it to eager mode;
5         Insert a BRDV instruction, BrdvInst, to verify the destination register
6            of LoadInst;
7         //Update Dag for the inserted BrdvInst
8         BuildInEdgesToBRDV (Dag, LoadInst, BrdvInst);
9         BuildOutEdgesFromBRDV (Dag, LoadInst, BrdvInst);
10     }
```

```
1      BuildInEdgesToBRDV(Dag, LoadInst, BrdvInst)
2      {
3         Add an edge from LoadInst to BrdvInst;
4         if (data speculative) add an edge to BrdvInst from each store which is an
5            unsatisfied control speculative predecessor of LoadInst;
6         if (control speculative) add an edge to BrdvInst from each compare which is
7            an unsatisfied control speculative predecessor of LoadInst;
8         if (LoadInst depends on a preceding speculative load)
9            add an edge from the BRDV of the speculative load to BrdvInst;
10     }
```

First, on line 3, BuildInEdgesToBRDV adds an edge from the instruction "LoadInst" to the instruction "BrdvInst." If the instruction "LoadInst" is a data speculated instruction, as detected on line 4, then BuildInEdgesToBRDV constructs an edge to the instruction "BrdvInst" from each store instruction which is an unsatisfied control speculative predecessor of the instruction "LoadInst." If, as detected on line 6, the instruction "LoadInst" is control speculative, then BuildInEdgesToBRDV constructs an edge from each compare instruction which is an unsatisfied control speculative predecessor of the instruction "LoadInst" to instruction "BrdvInst." These two edge addition operations insure that the instruction "BrdvInst" will be scheduled after the unsatisfied speculative predecessors of LoadInst. In this way, the tests for a target register having its speculative tag set to TRUE and for invalid entries in the memory conflicts table, conducted by the instruction "BrdvInst," will be performed by the instruction "BrdvInst" after any potentially aliasing store instruction and/or any guarding compare instruction will invalidate entries in the memory conflict table and set the speculative tag of a target register, respectively. Finally, on line 8, the routine "BuildInEdgesToBRDV" determines whether the instruction "LoadInst" depends on any preceding speculated load instructions and, if so, adds edges from the BRDV instructions that are matched with the preceding speculated load instructions on which the instruction "LoadInst" depends to the instruction "BrdvInst" so that the recovery code associated with the preceding speculated load instructions is executed prior to the recovery code that will be associated with the instruction "LoadInst."

The routine "BuildOutEdgesFromBRDV" adds edges into the dependence DAG from the inserted "BrdvInst" instruction to certain successors of the instruction "LoadInst." The routine "BuildOutEdgesFromBRDV" takes the dependence DAG "Dag," the instruction "LoadInst," and the instruction "BrdvInst" as arguments on line 1.

```
1   BuildOutEdgesFromBRDV(Dag, LoadInst, BrdvInst)
2   {
3       LiveInRegSet={};   // the set of registers used by the instructions which can be
4                          // scheduled across BrdvInst but the values of these registers
5                          // are defined independent to LoadInst
6       Traverse the DAG successors of LoadInst in a topological order
7       {
8           CurrInst = the current instruction being traversed;
9           EstablishEdge = False;
10          Edge Type = regular edge;
11          if (CurrInst already depends on BrdvInst)
12              Mark all of the successors of CurrInst dependent on BrdvInst;
13              continue;
14          TempLiveInRegSet = the registers used in CurrInst but with values defined
15                             independent to LoadInst;
16          if (C1: CurrInst may write to memory II
17              C2: CurrInst may overwrite any register in TempLiveInRegSet or
18                  LiveInRegSet II
19              C3: (LoadInst is data speculative && the qualifying predicate of CurrInst is
20                  in LiveInRegSet) II
21              C4: CurrInst may overwrite the destination register of LoadInst)
22          {
23              EstablishEdge =True;
24          }
25          if(C5: !EstablishEdge && CurrInst is an unsafe load)
26          {
27              EstablishEdge = True;
28              EdgeType = control speculative edge;
29          }
30          if(EstablishEdge)
31          {
32              Add an edge from BrdvInst to CurrInst based on Edge Type;
33              if (EdgeType == regular edge)
34                  Mark all of the successors of CurrInst dependent on BrdvInst;
35          }
36          else LiveInRegSet += TempLiveInRegSet;
37      }
38  }
```

The routine "BuildOutEdgesFromBRDV" uses a variable "LiveInRegSet" to accumulate a list of registers that are used by instructions that may be scheduled ahead of the instruct "BrdvInst" but which contain values defined by previously-scheduled instructions, i.e., instructions scheduled prior to instruction "LoadInst." Such registers are live with respect to the speculative chain of instructions that depend from instruction "LoadInst." Next, in the iterative loop comprising lines 6–37, the routine "BuildOutEdgesFromBRDV" traverses the successors of the instruction "LoadInst" in the dependence DAG in some topological order, skipping any successors that already depend on the instruction "BrdvInst." The variable "CurrInst," assigned on line 8, is essentially a loop variable that identifies the successor instruction that is currently being traversed in the iterative loop. On line 9, BuildOutEdgesFromBRDV sets the Boolean variable "EstablishEdge" to FALSE, and, on line 10, sets the variable "Edge Type" to the type "regular edge," corresponding to a normal flow dependence in the dependence DAG. If CurrInst already depends on instruction "BrdvInst," as detected on line 11, where the dependence relationship is represented by an edge in the dependency DAG, then, on line 12, BuildOutEdgesFromBRDV simply marks all the successors of CurrInst in the dependence DAGs as being dependent on BrdvInst so that the test on line 11 will succeed for the successors of CurrInst, and execution proceeds with the next successor of LoadInst in the next interation of the iterative loop comprising line 6–37. Otherwise, the routine "BuildOutEdgesFromBRDV" initializes the temporary variable "TempLiveInRegSet," on line 14, to those registers that are live with respect to the speculative chain of instructions depending from the instruction "LoadInst" and that are used by the instruction "CurrInst." Next, on lines 16–21, the routine "BuildOutEdges-FromBRDV" determines whether an edge in the dependence DAG should be established between the instruction "BrdvInst" and the instruction "CurrInst." By establishing an edge, the routine "BuildOutEdgesFromBRDV" will prevent the instruction "CurrInst" from being scheduled ahead of the instruction "BrdvInst" and, thus, prevent the instruction "CurrInst" from being on tile speculative chain of instructions that depend from the instruction "LoadInst."

The determination on lines 16–21 comprises four considerations, labeled "C1"–"C4." Condition "C1" prevents any instruction that depends on instruction "LoadInst" and that writes to memory from being on the speculative chain. This prevents both a corruption of memory prior to instruction "BrdvInst" that cannot be covered in the recovery block and also prevents the signaling of an exception by the dependent instruction upon detecting a set speculative tag of the register that is the target of the instruction "LoadInst." Condition "C2" prevents any dependent instruction that may overwrite a value that is live with respect to the speculative chain from being on the speculative chain. Once a live register is overwritten, the damage cannot be recovered because the recovery block can only include instructions that follow the instruction "LoadInst" in execution. The instruction that originally set the value of the live register cannot be re-executed in the recovery block. Under certain special circumstances, when exceptions are terminal and recovery code is not required, condition "C2" may be eliminated from the tests comprising lines 16–21. Condition "C3" excludes from the speculative chain a predicate instruction whose execution depends on a Boolean value that is generated on the data speculative chain to prevent an unrecoverable incorrect assignment. Condition "C4" prevents the destination or target register of the instruction "LoadInst" from being overwritten, so that the speculative tag of the destination register and any memory conflict table entries associated with the destination register will be undisturbed until the instruction "BrdvInst" is executed. Thus, if any of the conditions "C1"–"C4" evaluate to TRUE, then BuildOutEdgesFromBrdv sets the variable "EstablishEdge" to TRUE on line 23, resulting in construction of an edge between the instruction "BrdvInst" and the instruction "CurrInst."

On line 25, BuildOutEdgesFromBRDV determines whether the instruction "CurrInst" is an unsafe speculated instruction that depends on the instruction "LoadInst." If so, then BuildOutEdgesFromBRDV sets the variable "EstablishEdge" to TRUE and the variable "EdgeType" to the type "control speculative edge" on lines 27–28. This guarantees that, if the instruction "CurrInst" is scheduled ahead of the instruction "BrdvInst", then the instruction "CurrInst" will be converted to eager-mode in order to prevent premature signaling of a second exception arising from speculation of the instruction "LoadInst." Finally, on lines 30–35, routine BuildOutEdgesFromBRDV adds an edge from instruction "BrvdInst" to the instruction "CurrInst" if the variable "EstablishEdge" has been set to TRUE in the preceding lines of the iterative loop. BuildOutEdgesFromBRDV also marks all successors of instruction "CurrInst" to be dependent on "BrdvInst" when the variable "EdgeType" contains the value "regular edge." If the variable "EstablishEdge" evaluates to FALSE, then BuildOutEdgesFromBRDV adds the live registers detected as being used by the instruction "CurrInst" to the live-register-set variable "LiveInRegSet."

The second set of routines that are to be discussed with regard to the implementation of a preferred embodiment of the present invention include routines that generate recovery block code in the separate step 1312 following the list scheduling step 1310 in FIG. 13. The first routine, "RecoveryCodeGen," shown below, is the top-level routine that implements recovery block generation.

```
1    RecoveryCodeGen()
2    {
3        Number instructions in a topological ordering;
4        for each BRDV instruction, BrdvInst
5        {
6            LoadInst = the speculative load that BrdvInst verifies;
7            InstsOnSpecChainSet = {}
8            IdentifyFlowDepInstsOnSpecChain (LoadInst, BrdvInst
9                        InstsOnSpecChainSet);
10           IdentifyOutputDepInstsOnSpecChain (LoadInst, BrdvInst
11                       InstsOnSpecChainSet);
12           GenerateRecoveryCode (LoadInst, BrdvInst, InstsOnSpecChainSet);
13       }
14   }
```

On line 3, RecoveryCodeGen first numbers all the instructions in the current procedure in some topological order, ignoring any back or retreating edges in an irreducible graph. Then, RecoveryCodeGen selects, in turn, each BRDV instruction in the dependence DAG in the for loop comprising lines 4–13. For each BRDV instruction, RecoveryCodeGen first determines the speculated instruction "LoadInst" that is mapped to, or verified by, a selected BRDV instruction "BrdvInst." Next, on line 7, the RecoveryCodeGen initializes a loop variable "InstOnSpecChainSet" to the empty set. The variable "InstOnSpecChainSet" will eventually contain a list of all the instructions on the speculative chain of the instruction "LoadInst." Then, on lines 8 and 10, RecoveryCodeGen calls the routines "IdentifyFlowDepInstsOnSpecChain" and "IdentifyOutputDepInstsOnSpecChain," respectively, to identify and include in the variable "InstOnSpecChainSet" each instruction that is flow-dependent or output-dependent on instruction "LoadInst." Finally, on line 12, RecoveryCodeGen calls the routine "GenerateRecoveryCode" to generate a recovery block for handling potential errors that arise as a result of execution the speculated instruction "Load-Inst." Thus, within the for loop comprising lines 4–13, a recovery block is generated by RecoveryCodeGen for each BRDV instruction within the dependence DAG.

The routine "IdentifyFlowDepInstsOnSpecChain" identifies all instructions that have flow dependencies on the speculated instruction "LoadInst," supplied as a first argument, that is verified by instruction "BrdvInst," supplied as a second argument, and places the identified flow dependent instructions into the list of dependent instructions identified by the third argument "InstOnSpecChainSet."

In each iteration of the while loop comprising lines 4–37, execution of IdentifyFlowDepInstsOnspecChain proceeds in the following manner. First, on line 6, IdentifyFlowDepInstOnSpecChain removes an instruction from the variable "WorkList" and places that instruction into the variable "CurrInst." The set defined by the argument "InstOnSpecChainSet" is augmented to include the instruction "CurrInst." On line 8, the instruction "CurrInst" is marked as processed by IdentifyFlowDepInstOnSpecChain. Then, in a for loop comprising lines 9–36, IdentifyFlowDepInstOnSpecChain selects and processes each instruction that uses a value that is defined by the instruction "CurrInst." IdentifyFlowDepInstOnSpecChain finds the selected instruction, placed in a for loop variable "UseInst," on the defuse chain associated with the instruction "CurrInst" in the SSA-form intermediate code. During each iteration of the for loop comprising lines 9–36, IdentifyFlowDepInstOnSpecChain determines, on lines 12–13, whether the instruction "UseInst" precedes the instruction "BrdvInst." This determination is made on the basis of the topological numbering assigned to each instruction in the routine "RecoveryCodeGen." If the instruction "UseInst" precedes the instruction

```
1   IdentifyFlowDepinstsOnspecChain(LoadInst, BrdvInst, InstsOnSpecChainSet)
2   {
3      WorkList = (LoadInst);
4      while (WorkList != {})
5      {
6         CurrInst = retrieve and remove an instruction from WorkList;
7         InstsOnSpecChainSet += CurrInst;
8         Mark CurrInst processed;
9         for each instruction, UseInst, which uses a value defined in CurrInst by following
10        SSA def-use chains
11        {
12           if (UseInst.TopoNumber < BrdvInst.TopoNumber &&
13              UseInst has not been processed)
14           {
15              if (UseInst is a speculative load)
16              {
17                 if (UseInst is control speculative only)
18                 {
19                    if (UseInst is control speculative only)
20                    {
21                       if (UseInst has no corresponding BRDV) WorkList += UseInst;
22                    }
23                    {
24                    else
25                    }
26                       if (UseInst is control speculative only) WorkList += UseInst;
27                    else
28                    {
29                       InstsOnSpecChainSet += UseInst;
30                       Mark UseInst processed;
31                    }
32                 }
33              }
34              else WorkList += UseInst;
35           }
36        }
37     }
38  }
```

The routine "IdentifyFlowDepInstsOnspecChain" makes use of a variable "WorkList," declared on line 3, that is initialized to include the instruction "LoadInst." IdentifyFlowDepInstsOnspecChain then iterates, for each instruction contained in the variable "WorkList," the while loop comprising lines 4–37. Note that, during any particular iteration of the while loop comprising lines 4–37, instructions may be added to and removed from the set defined by the variable "WorkList."

"BrdvInst" and the instruction "UseInst" has not been previously processed by IdentifyFlowDepInstOnSpecChain, then, if instruction "UseInst" is not a speculative load instruction, IdentifyFlowDepInstOnSpecChain adds the instruction "UseInst" to the set defined by the variable "WorkList" on line 34. If the instruction "UseInst" is a speculated load instruction, then IdentifyFlowDepInstOnSpecChain may add the instruction "UseInst" to the set defined by the variable "WorkList," depending on lines 17–33 that essentially implement the cascaded speculation considerations discussed above in the previous section. In terms of these considerations, the instruction "LoadInst" represents the first instruction on the left-hand side of the arrow in the cascaded speculation abbreviations, and the instruction "UseInst" represents the instruction on the right-hand side of the arrow in cascaded speculation considerations. On line 21, IdentifyFlowDepInstOnSpecChain has determined that both the instruction "UseInst" and instruction "LoadInst" are purely control speculated, and that, since the instruction "UseInst" does not have a corresponding BRDV instruction, the instruction "UseInst" should be included on the speculative chain of the instruction "LoadInst," as discussed above in the subsection "C→C" within the previous section that describes the cascaded speculation considerations. The test on line 26 corresponds to determining whether the instruction "LoadInst" is data or data and control speculated and the instruction "UsedInst" is purely control speculated. If so, then IdentifyFlowDepInstOnSpecChain adds the instruction "UsedInst" to the speculative chain depending from instruction "LoadInst," according to the discussion of "D or CD→C" cascaded speculation, above. Otherwise, both instructions "UseInst" and "LoadInst" are data or data and control speculated, and, as discussed above for "D or CD→D or CD" cascaded speculation, instruction "UseInst" should be added to the speculative chain, on line 29, but none of the successors of "UseInst" should be added to the speculative chain depending from instruction "LoadInst." Therefore, on line 30, IdentifyFlowDepInstOnSpecChain marks the instruction "UseInst" as having been processed and is not added to the set defined by the variable "WorkList" in order to prevent successors of the instruction "UseInst" from being added to the speculative chain.

Instructions that depend on a speculated instruction via output dependencies need also to be found and included on the speculative chain of the speculated instruction. The routine "IdentifyOutputDepInstOnSpecChain" identifies successor instructions that both depend on the instruction "LoadInst" and that precede the BRDV instruction "BrdvInst," supplied as the first and second arguments, respectively. The identified output-dependent instructions are included in the list of instructions contained in the set variable "InstOnSpecChainSet," supplied as the third argument to the routine "IdentifyOutputSetInstOnSpecChain."

```
1    IdentifyOutputDepInstsOnSpecChain(LoadInst, BrdvInst, InstsOnSpecChainSet)
2    {
3       SpecChainRegDefSet = {};
4       Traverse every instruction from LoadInst to BrdvInst in a topological ordering
5       {
6          CurrInst = the current instruction being traversed;
7          if (CurrInst is already in InstsOnSpecChainSet)
8             SpecChainRegDefSet +=every register defined by CurrInst;
9          else
10         {
11            if (a register defined in CurrInst may redefine any register in
12               SpecChainRegDefSet)
13            {
14               InstsOnSpecChainSet += CurrInst;
15               SpecChainRegDefSet += every register defined by CurrInst;
16            }
17         }
18      }
19   }
```

The variable "SpecChainRegDefSet," declared on line 3, is used by the routine "IdentifyOutputDepInstOnSpecChain" to hold a list of registers that are re-defined by instructions that succeed the instruction "LoadInst" and precede the instruction "BrdvInst." Instructions that redefine registers defined by instructions already on the speculative chain of instructions that depend from instruction "LoadInst" need to be included on the speculative chain. Next, in a for loop comprising lines 4–18, IdentifyOutputDepInstOnSpecChain traverses every instruction that succeeds the instruction "LoadInst" and that precedes the instruction "BrdvInst" in a topological order in order to find output dependent instructions. For each instruction selected into the for loop variable "CurrInst" during each iteration of the for loop comprising lines 4–18, IdentifyOutputDepInstOnSpecChain determines, on line 7, whether the instruction is already in the set "InstOnSpecChainSet." If so, then the set "SpecChainRegDefSet" of registers that are defined by speculative chain instructions is augmented by those registers that are defined by CurrInst, if any. Otherwise, IdentifyOutputDepInstOnSpecChain, on line 11, determines whether CurrInst redefines any registers already in the set "SpecChainRegDefSet." If so, then the instruction "CurrInst" is placed into the set "InstOnSpecChainSet" and the set of registers "SpecChainRegDefSet" is augmented with those registers that are defined by instruction "CurrInst."

Finally, the routine "GenerateRecoveryCode" generates a recovery block corresponding to the instruction "LoadInst," verified by the BRDV instruction "BRDVInst," supplied as the first and second arguments, respectively. The routine "GenerateRecoveryCode" uses the list of instructions identified as being on the speculative chain of instructions that depend from instruction "LoadInst," passed to GenerateRecoveryCode in the third argument "InstOnSpecChainSet."

```
1   GenerateRecoveryCode (LoadInst, BrdvInst, InstsOnSpecChainSet)
2   {
3     if (there is only on instruction, i.e. LoadInst, in InstsOnSpecChainSet)
4     {
5        Convert BrdvInst to a LDV;
6        return;
7     }
8     Create a recovery block, RecoveryBlock;
9     for each instruction in instsOnSpecChainSet
10    {
11       CurrInst = the current instruction being processed;
12       if (CurrInst is a speculative load &&
13          CurrInst != LoadInst)
14       {
15         if (LoadInst is control speculative load only)
16             duplicate CurrInst and append CurrInst to Recovery Block
17         else
18         {
19           if (CurrInst is control speculative only)
20           {
21             duplicate CurrInst and append CurrInst to Recovery Block
22           }
23           else append INVR (target register of LoadInst) instruction to Recovery Block
24         }
25       }
26       else
27       {
28          Duplicate CurrInst in a non-speculative mode and append to Recovery Block;
29       {
30    }
31    Add a branch instruction at the end of RecoveryBlock to branch back to the
32       instruction following BrdvInst;
33  }
```

If GenerateRecoveryCode determines, on line 3, that the instruction "BrdvInst" is the only instruction on the speculative chain, then instruction "BrdvInst" can simply be converted to an "LDV" instruction. The "LDV" instruction will detect a set speculative tag on the target register or an invalid entry in the memory conflict table associated with the target register and reload the target register from memory. Otherwise, a recovery block needs to be created. GenerateRecoveryCode creates an empty recovery block, "RecoveryBlock," on line 8. Then, in a for loop comprising lines 9–30, GenerateRecoveryCode selects each instruction on the speculative chain of instructions that depend from instruction "LoadInst" into the for loop variable "CurrInst" during each iteration of the for loop. If the instruction "CurrInst" is a speculative load instruction and the instruction "CurrInst" is not the instruction "LoadInst," as detected on lines 12–13, then GenerateRecoveryCode may or may not convert the instruction "CurrInst" to an equivalent non-eager-mode instruction prior to copying instruction "CurrInst" to the recovery block, depending on the cascaded speculated instruction considerations considered above. If the instruction "LoadInst" is a purely control speculated instruction and the instruction "CurrInst" is also be a purely control speculated instruction, then CurrInst is already in eager mode, and is duplicated and appended in eager mode to the recovery block on line 16. Otherwise, the instruction "LoadInst" is a data or combined control and data speculated instruction. If the instruction "CurrInst" is purely control speculated, as detected on line 19, then instruction "CurrInst" is already in eager mode and GenerateRecoveryCode duplicates and appends the instruction to the recovery block on line 21. If, on the other hand, instruction "CurrInst" is a data or combined control and data speculated instruction, as detected on line 23, then GenerateRecoveryCode appends an instruction that invalidates memory conflict table entries associated with the target register of the instruction "Load-Inst" to the recovery block, as discussed above. If the instruction "CurrInst" is not a speculative load instruction, then, on line 28, GenerateRecoveryCode appends instruction "CurrInst" to the recovery block as a non-eager-mode equivalent instruction. Finally, at the conclusion of execution of the for loop comprising lines 9–30, GenerateRecoveryCode appends an unconditional branch instruction to the recovery block in order to return execution to the instruction following the instruction "BrdvInst" after execution of the recovery block.

The recovery blocks are generated as late as possible in the compilation process, but before register allocation, during which virtual registers in the recovery blocks are converted to machine registers. Once recovery blocks are generated, any changes to the speculative chain of the corresponding speculated instruction are avoided, and the speculatively scheduled instructions may not be de-speculated.

Because the inserted BRDV branch instructions do not, in a preferred embodiment of the present invention, terminate basic blocks, it becomes difficult to connect recovery blocks to the control flow graph, since the branch to the recovery block is not the last instruction of another basic block. Instead of connecting recovery blocks to the control flow graph, a preferred embodiment of the present invention summarizes information about register use within the recovery block and associates this information with the BRDV instruction corresponding to the recovery block. Data flow analysis and interference graph construction for register allocation need only the summary information, rather than explicit control flow nodes corresponding to the recovery blocks. This summary information also prevents any speculative chain from being modified by post-register-allocation scheduling. Also, since recovery blocks are infrequently executed, they are grouped together and laid out separately from the main execution phase in order to minimize their impact on instruction cache.

Advantageous Aspects of the Above-Discussed Embodiment of the Present Invention Although both control speculation and data speculation are currently recognized as potential opportunities for compiler optimizations, currently-available implementations and proposals for implementations lack complete recovery of all possible run time errors arising from control and data speculation. The recovery block generation component of the present invention provides complete run-time error recovery, so that an optimized program featuring control and data speculation, produced by a compiler incorporating the embodiment of the present invention, is completely equivalent to the source-language program from which the optimized program is compiled. Moreover, the unified framework for both control and data speculation of the present invention both simplifies compiler construction and increases the instruction level parallelism and program performance resulting from control and data speculation optimizations. The approach of the present invention handles predicated instructions and can be used for optimizing SSA-form intermediate code programs. Although the above-described preferred embodiment of the present invention relies on certain architectural features of the HPL PlayDoh architecture, the present invention is generally implementable on many different types of hardware platforms, and is also implementable through software simulation of certain features of the above-described HPL PlayDoh architecture. Recovery blocks are generated by the compiler without additional hardware support. Finally, by separating list scheduling aspects of the present invention from the recovery block generation phase, various side effects and interdependencies between the implementation of control and data speculation components and other compiler components are avoided, and various other optimization strategies are minimally impacted by the addition of data and control speculation.

Although the present invention has been described in terms of a particular embodiment, it is not intended that the invention be limited to this embodiment. Modifications within the spirit of the invention will be apparent to those skilled in the art. For example, as noted above, control and data speculation implemented according to the present invention may be included in any number of different types of compilers for compiling any number of different types of source-language programs written in any number of different programming languages to equivalent assembly-language and/or machine code instruction programs for execution on any number of different types of computer systems. Those features of the HPL PlayDoh architecture relied upon by the above-discussed preferred embodiment are not required for implementation of the invention. Similar features may be employed on computers corresponding to different architectures. These features may be simulated by software or middleware routines when the optimizations based on control and data speculation more than offset any inefficiencies incurred by the software or middleware simulations. The control and data speculation optimization routines that implement the present invention may be written in any number of different languages and may be implemented in many ways. Although the above-discussed preferred embodiment focussed on the speculation of unsafe load instructions, the methods of the present invention may be employed for speculating other types of instructions that can produce unsafe exceptions, alterations of the contents of memory, or other unsafe conditions that may result in unexpected execution behavior.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A method for scheduling execution of computer instructions, within a portion of an original computer program that defines a run-time operation, to produce a scheduled portion of the computer program that performs the defined run-time operation upon execution on a computer system, the method comprising:

identifying potentially speculated instructions in the portion of the original computer program, each potentially speculated instruction one of a potentially data speculated instruction, a potentially control speculated instruction and a potentially control and data speculated instruction;

scheduling a number of the identified potentially speculated instructions to produce an intermediate-level scheduled portion of the computer program containing speculated instructions; and producing the scheduled portion of the computer program from the intermediate-level scheduled portion of the computer program by adding instructions to the intermediate-level scheduled portion of the computer program to detect and resolve inconsistencies, between the run-time operation of the scheduled portion of the computer program and the defined run-time operation, arising from execution of the speculated instructions.

2. The method of claim 1 further including inserting a speculative edge for each potential control speculation and a speculative edge for each potential data speculation into a dependence directed acyclic graph that represents dependencies between instructions of the portion of the original program.

3. The method of claim 2 wherein, during scheduling of the instructions in the original program for execution, when no next unscheduled candidate instruction without unresolved dependencies is available for scheduling, an instruction may be selected for scheduling from the unscheduled instructions having only unresolved speculative dependencies.

4. The method of claim 2 wherein, after scheduling a potentially speculated instruction, a matching conditional branch instruction is inserted into the intermediate-level scheduled portion of the computer program following the speculated instruction that will detect, during execution of the scheduled portion of the computer program, an exception generated by the speculated instruction that does not correspond to the defined run-time operation and that will detect an aliasing store by a store instruction that preceded the speculated instruction in the original computer program but that succeeds the speculated instruction in the scheduled portion of the computer program.

5. The method of claim 4 wherein, after insertion of a conditional branch instruction into the intermediate-level scheduled portion of the computer program to match a speculatively scheduled instruction, the dependence directed acyclic graph is updated to add speculative edges from instructions, on which the inserted conditional branch instruction depends, that are scheduled to precede the inserted conditional branch instruction to the inserted conditional branch instruction and to add speculative edges from the inserted conditional branch instruction to instructions that succeed the inserted conditional branch instruction and that depend on the inserted conditional branch instruction.

6. The method of claim 5 wherein producing the scheduled portion of the computer program from the intermediate-level scheduled portion of the computer program further includes, for each speculatively scheduled instruction:

preparing an empty recovery block;

traversing the dependence directed acyclic graph that includes speculative edges, copying the speculated instruction and any instructions that depend on the speculated instruction that succeed the speculated instruction and that precede the conditional branch instruction that matches the speculated instruction to the recovery block;

modifying the conditional branch instruction to branch to the first instruction in the recovery block, and adding an unconditional branch instruction to the end of the recovery block to branch to the instruction that follows the conditional branch instruction; and including the recovery block in the scheduled portion of the computer program.

7. The method of claim 6, implemented on a computer system that complies with the HPL PlayDoh architecture, wherein the control speculated instructions are load instructions that are scheduled ahead of compare instructions that prevent execution of the load instruction, in the original computer program, in cases where the load instruction generates an exception, wherein the data speculated instructions are load instructions that are scheduled ahead of store instructions that alias the contents of memory locations that are the sources of the load instructions, wherein BRDV instructions are inserted into the intermediate-level scheduled portion of the computer program to match speculatively scheduled instructions in order to detect exceptions and aliasing stores, during execution, and direct the flow of execution to corresponding recovery blocks, wherein control speculative load instructions are replaced by equivalent eager-mode load instructions, and wherein data speculated instructions are replaced by equivalent LDS instructions.

8. A computer-readable medium containing computer instructions that implement a compiler that schedules potentially control and data speculated instructions by:

identifying potentially speculated instructions in the portion of the original computer program, each potentially speculated instruction one of a potentially data speculated instruction, a potentially control speculated instruction, and a potentially control and data speculated instruction;

scheduling a number of the identified potentially speculated instructions to produce an intermediate-level scheduled portion of the computer program containing speculated instructions; and producing the scheduled portion of the computer program from the intermediate-level scheduled portion of the computer program by adding instructions to the intermediate-level scheduled portion of the computer program to detect and resolve inconsistencies, between the run-time operation of the scheduled portion of the computer program and the defined run-time operation, arising from execution of the speculated instructions.

9. A computer-readable medium containing computer instructions of a computer program that has been compiled by a compiler that schedules potentially control and data speculated instructions by:

identifying potentially speculated instructions in the portion of the original computer program, each potentially speculated instruction one of a potentially data speculated instruction, a potentially control speculated instruction, and a potentially control and data speculated instruction;

scheduling a number of the identified potentially speculated instructions to produce an intermediate-level scheduled portion of the computer program containing speculated instructions; and producing the scheduled portion of the computer program from the intermediate-level scheduled portion of the computer program by adding instructions to the intermediate-level scheduled portion of the computer program to detect and resolve inconsistencies, between the run-time operation of the scheduled portion of the computer program and the defined run-time operation, arising from execution of the speculated instructions.

10. Electronic signals embodied in a carrier wave that encode the computer instructions of a computer program that has been compiled by a compiler that schedules potentially control and data speculated instructions by:

identifying potentially speculated instructions in the portion of the original computer program, each potentially speculated instruction one of a potentially data speculated instruction, a potentially control speculated instruction, and a potentially control and data speculated instruction;

scheduling a number of the identified potentially speculated instructions to produce an intermediate-level scheduled portion of the computer program containing speculated instructions; and producing the scheduled portion of the computer program from the intermediate-level scheduled portion of the computer program by adding instructions to the intermediate-level scheduled portion of the computer program to detect and resolve inconsistencies, between the run-time operation of the scheduled portion of the computer program and the defined run-time operation, arising from execution of the speculated instructions.

11. Electronic signals embodied in a carrier wave that encode computer instructions of a compiler that schedules potentially control and data speculated instructions by:

identifying potentially speculated instructions in the portion of the original computer program, each potentially speculated instruction one of a potentially data speculated instruction, a potentially control speculated instruction, and a potentially control and data speculated instruction;

scheduling a number of the identified potentially speculated instructions to produce an intermediate-level scheduled portion of the computer program containing speculated instructions; and producing the scheduled portion of the computer program from the intermediate-level scheduled portion of the computer program by adding instructions to the intermediate-level scheduled portion of the computer program to detect and resolve inconsistencies, between the run-time operation of the scheduled portion of the computer program and the defined run-time operation, arising from execution of the speculated instructions.

12. A data structure stored in the memory of a computer system that contains an intermediate-level scheduled portion of a computer program prepared by a method comprising:

identifying potentially speculated instructions in the portion of the original computer program, each potentially speculated instruction one of a potentially data speculated instruction, a potentially control speculated instruction, and a potentially control and data speculated instruction;

scheduling a number of the identified potentially speculated instructions to produce an intermediate-level scheduled portion of the computer program containing speculated instructions; and producing the scheduled portion of the computer program from the intermediate-level scheduled portion of the computer program by adding instructions to the intermediate-level scheduled portion of the computer program to detect and resolve inconsistencies, between the run-time operation of the scheduled portion of the computer program and the defined run-time operation, arising from execution of the speculated instructions.

13. A system for compiling a source-language program to produce an optimized executable computer program that includes speculated instructions, the system comprising:

a source-language program to be compiled;

a computer system, on which the source-language program is stored, that executes computer programs; and a compiler program executed on the computer system that comprises:

a number of components that conduct lexical, syntactic, and semantic analysis of the source-language program to produce an unoptimized compiled program;

a scheduling component that schedules instructions of the unoptimized compiled program to produce an optimized executable program, the scheduling component scheduling potentially speculated instructions to produce speculated instructions; and a recovery block generation component that inserts recovery blocks into the optimized computer program, each recovery block corresponding to at least one speculated instruction, a recovery block invoked during execution of the optimized computer program to correct execution of one or more corresponding speculated instructions that do not conform to the execution defined by the source-language program.

14. The system of claim 13 wherein, for each portion of the unoptimized compiled program scheduled by the scheduling component, a dependence directed acyclic graph is prepared that contains a speculative edge that correspond to any speculative dependence between a potentially speculated instruction and an instruction that precedes the potentially speculated instruction in the unoptimized compiled program that, if scheduled after the potentially speculated instruction in the optimized executable program, may lead to execution of the speculated instruction that does not conform to the execution defined by the source-language program.

15. The system of claim 14 wherein potentially speculated instructions include potentially control speculated instructions, a potentially control speculated instruction following a compare instruction in the unoptimized compiled program that sets a predicative value that prevents execution of the potentially control speculated instruction in cases where the potentially control speculated instruction would generate an exception, the potentially control speculated instruction becoming a control speculated instruction when scheduled ahead of the compare instruction in the optimized executable program.

16. The system of claim 14 wherein potentially speculated instructions include potentially data speculated instructions, a potentially data speculated instruction accessing a value in a memory location and following a store instruction in the unoptimized compiled program that sets a value in a memory location, the potentially data speculated instruction becoming a data speculated instruction when scheduled ahead of the store instruction in the optimized executable program.

17. The system of claim 14 wherein the scheduling component selects a next instruction for scheduling from a list of unscheduled candidate instructions during a traversal of a dependence directed acyclic graph, the list of unscheduled candidate instructions including unscheduled instructions with no unresolved dependencies and unscheduled instructions with only unresolved speculative dependencies, the scheduling component selecting unscheduled instructions with only unresolved speculative dependencies for scheduling when the candidate list does not include any unscheduled instructions with no unresolved dependencies.

18. The system of claim 14 wherein the scheduling component inserts a conditional branch instruction into the optimized executable program after scheduling a speculated instruction to detect, during execution of the optimized executable program, execution of the speculated instruction that does not conform to the execution defined by the source-language program.

19. The system of claim 18 wherein the inserted conditional branch instruction detects a speculative tag associated with a target register of the speculated instruction having been set to indicate generation of an exception during execution of the speculated instruction.

20. The system of claim 18 wherein the inserted conditional branch instruction detects a memory conflict logged by a store instruction that follows execution of a speculated instruction and that stores a value in the memory location that is accessed by the speculated instruction.

21. The system of claim 18 wherein the scheduling component modifies the dependence directed acyclic graph to include the inserted conditional branch instruction, the scheduling component adding dependence edges between the inserted conditional branch instruction and already scheduled instructions that need to precede execution of the conditional branch instruction and adding dependence edges between the inserted conditional branch instruction and instructions that need to be executed following execution of the inserted conditional branch instruction.

22. The system of claim 21 wherein the recovery block generation component prepares a recovery block to correspond to a speculated instruction by:

copying the speculated instruction to the recovery block;

copying additional instructions from the optimized executable program that are scheduled for execution following execution of the speculated instruction and preceding execution of the inserted conditional branch instruction that corresponds to the speculated instruction and that depend on the speculated instruction; and adding an unconditional branch instruction to the end of the recovery block to direct the flow of execution to the instruction following the conditional branch instruction in the optimized executable program.

23. The system of claim 22 wherein a speculated instruction is copied to the recovery block as an equivalent instruction that does not set a speculative tag and that does not log a memory conflict.

24. The system of claim 22 wherein the recovery block generation component identifies and prepares recovery blocks to recover errors resulting from cascaded speculated instructions, including a second purely control speculated instruction following a first purely control speculated instruction, a second purely control speculated instruction following a first data or data and control speculated instruction, a second data or data and control speculated instruction following a first purely control speculated instruction, and a second data or data and control speculated instruction following a first data or data and control speculated instruction.

25. The system of claim 13 implemented on a computer system compliant with the HPL PlayDoh architecture.

26. A computer-readable medium containing computer instructions that implement a compiler program that comprises:
- a number of components that conduct lexical, syntactic, and semantic analysis of the source-language program to produce an unoptimized compiled program;
- a scheduling component that schedules instructions of the unoptimized compiled program to produce an optimized executable program, the scheduling component scheduling potentially speculated instructions to produce speculated instructions; and
- a recovery block generation component that inserts recovery blocks into the optimized computer program, each recovery block corresponding to at least one speculated instruction, a recovery block invoked during execution of the optimized computer program to correct execution of a corresponding speculated instruction that does not conform to the execution defined by the source-language program.

27. A computer-readable medium containing computer instructions of an optimized executable computer program that includes control and data speculated instructions with recovery blocks produced by a compiler program that comprises:
- a number of components that conduct lexical, syntactic, and semantic analysis of the source-language program to produce an unoptimized compiled program;
- a scheduling component that schedules instructions of the unoptimized compiled program to produce an optimized executable program, the scheduling component scheduling potentially speculated instructions to produce speculated instructions; and
- a recovery block generation component that inserts recovery blocks into the optimized computer program, each recovery block corresponding to at least one speculated instruction, a recovery block invoked during execution of the optimized computer program to correct execution of a corresponding speculated instruction that does not conform to the execution defined by the source-language program.

* * * * *